United States Patent
Pam et al.

(10) Patent No.: US 10,789,399 B2
(45) Date of Patent: Sep. 29, 2020

(54) COMPENSATION DESIGN OF POWER CONVERTERS

(71) Applicant: Texas Instruments Incorporated, Dallas, TX (US)

(72) Inventors: Srikanth Pam, Bangalore (IN); Yudhister Satija, Panchkula (IN); Pradeep Kumar Chawda, Cupertino, CA (US); Makram Mounzer Mansour, San Jose, CA (US); Robert Mason Hanrahan, Montvale, NJ (US); Jeffrey Robert Perry, Cupertino, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/540,121

(22) Filed: Aug. 14, 2019

(65) Prior Publication Data
US 2019/0370428 A1 Dec. 5, 2019

Related U.S. Application Data

(63) Continuation of application No. 15/217,963, filed on Jul. 22, 2016, now Pat. No. 10,423,746.

(60) Provisional application No. 62/196,204, filed on Jul. 23, 2015.

(51) Int. Cl.
| | |
|---|---|
| *G06F 30/30* | (2020.01) |
| *G06F 30/373* | (2020.01) |
| *G06F 119/06* | (2020.01) |
| *G06F 119/10* | (2020.01) |
| *G06F 30/36* | (2020.01) |

(52) U.S. Cl.
CPC .......... *G06F 30/30* (2020.01); *G06F 30/373* (2020.01); *G06F 30/36* (2020.01); *G06F 2119/06* (2020.01); *G06F 2119/10* (2020.01)

(58) Field of Classification Search
CPC ......... G06F 30/30; G06F 30/36; G06F 30/373
See application file for complete search history.

(56) References Cited

U.S. PATENT DOCUMENTS

| | | | |
|---|---|---|---|
| 5,946,210 A | 8/1999 | Montminy et al. | |
| 7,007,176 B2 | 2/2006 | Goodfellow et al. | |
| 7,622,820 B1 | 11/2009 | Prodic et al. | |
| 8,972,216 B2 | 3/2015 | Tang et al. | |
| 9,698,683 B2 | 7/2017 | Babazadeh et al. | |
| 9,755,512 B2 | 9/2017 | Jiang | |

(Continued)

OTHER PUBLICATIONS

Srikanth Pam et al, "A Web-based tool for Compensation Design of Power Converters using Hybrid Optimization", 2016 IEEE Applied Power Electronics Conference and Exposition (APEC), Mar. 20-24, 2016, Long Beach, CA, pp. 3266-3272.

(Continued)

*Primary Examiner* — Stacy Whitmore
(74) *Attorney, Agent, or Firm* — Ebby Abraham; Charles A. Brill; Frank D. Cimino

(57) ABSTRACT

A method for compensation network design in a power converter design system is provided that includes computing optimal values for compensation components in a compensation network based on a plurality of loop specifications comprising crossover frequency (Fco), phase margin (PM), Gain Margin (GM), and low frequency gain (LFG), and applying changes to a power converter design comprising the compensation network based on the optimal values.

15 Claims, 15 Drawing Sheets

(56) References Cited

U.S. PATENT DOCUMENTS

| | | |
|---|---|---|
| 2002/0144163 A1 | 10/2002 | Goodfellow et al. |
| 2010/0064146 A1 | 3/2010 | Boles et al. |
| 2011/0025292 A1 | 2/2011 | Huang et al. |
| 2014/0137069 A1 | 5/2014 | Duff et al. |
| 2018/0120365 A1 | 5/2018 | Bhardwaj |
| 2019/0067939 A1 | 2/2019 | Sheng et al. |
| 2019/0115830 A1 | 4/2019 | Giuliano |

OTHER PUBLICATIONS

Hangseok Choi, "Practical Feedback Loop Design Considerations for Switched Mode Power Supplies", Fairchild Semiconductor Power Seminar, 2010-2011, pp. 1-14.

Singiresu S. Rao, "Engineering Optimization, Theory and Practice", John Wiley & Sons, Inc., Hoboken, NJ, Jul. 2009, pp. 319-345.

S. Samanta et al, "Constrained Optimization Based Compensation Design for Power Converters using Method of Feasible Directions", 2012 Twenty-Seventh Annual IEEE Applied Power Electronics Conference and Exposition, Feb. 5-9, 2012, Orlando, FL, pp. 715-720.

Kaiwei Yao, et al, "Critical Bandwidth for the Load Transient Response of Voltage Regulator Modules", IEEE Transactions on Power Electronics, vol. 19, No. 6, Nov. 2004, pp. 1454-1461.

Kenneth V. Price, et al, "Differential Evolution, A Practical Approach to Global Optimization", Springer-Verlag Berlin Heidelberg, 2005, pp. 37-47.

Subhoji Ghosh and Susovon Samanta, "Fixed Structure Compensator Design using a Constrained Hybrid Evolutionary Optimization Approach", ISA Transactions, vol. 53, Issue 4, Jul. 2014, Elsevier, pp. 1119-1130.

Timothy Hegarty, "Voltage-mode Control and Compensation: Intricacies for Buck Regulators", EDN Network, Jun. 30, 2008, pp. 1-22.

Krzysztof Bandurski and Wojciech Kwedlo, "A Lamarckian Hybrid of Differential Evolution and Conjugate Gradients for Neural Network Training", Neural Process Letters, first online Jun. 23, 2010, published Aug. 2010, vol. 32, Issue 1, pp. 31-44.

"LM2585 Simple Switcher 3A Flyback Regulator", SNVS120F, Apr. 2000, Revised Apr. 2013, Texas Instruments, Inc., pp. 1-32.

"LM21215A 15—A Ultra High-Efficiency Synchronous Buck Converter With Frequency Synchronization", SNOSB87C, Mar. 2011, Revised Jan. 2016, Texas Instruments, Inc., pp. 1-38.

R. D. Middlebrook, "Modeling Current-Programmed Buck and Boost Regulators", IEEE Transactions on Power Electronics, vol. 4, No. 1, Jan. 1989, pp. 36-52.

Seiya Abe et al, "Pole-Zero-Cancellation Technique for DC-DC Converter", Chapter 10, "Advances in PID Control", V.D. Yurkevich, ed., InTech, Sep. 6, 2011, pp. 189-208.

Amir M. Rahimi, et al, "Compensator Design Procedure for Buck Converter with Voltage-Mode Error-Amplifier", Application Note AN-1162, International Rectifier, May 6, 2012, pp. 1-36.

"Understanding Buck Power Stages in Switchmode Power Supplies", SLVA057, Texas Instruments, Inc., Mar. 1999, p. 1-36.

Robert Sheehan, "Understanding and Applying Current-Mode Control Theory, Practical Design Guide for Fixed-Frequency, Continuous Conduction-Mode Operation", Power Electronics Technology Exhibition and Conference, Oct. 30-Nov. 1, 2007, Dallas, TX, pp. 1-30.

"WEBENCH Design Center", Texas Instruments, Inc., 1Q 2016, pp. 1-7.

Byungcho Choi, Step Load Response of a Current-Mode-Controlled DC-to-DC Converter, IEEE Transactions on Aerospace and Electronic Systems, vol. 33, No. 4, Oct. 1997, pp. 1115-1121.

F. Dong Tan and R. D. Middlebrook, "A Unified Model for Current-Programmed Converters", IEEE Transactions on Power Electronics, vol. 10, No. 4, Jul. 1995, p. 397-408.

Sung-Soo Hong, Byungcho Choi and Hyun-Sik Ahn, "The Unified Model for Current-Mode Control: An Alternative Derivation", Journal of Circuits, Systems, and Computers, vol. 13, No. 4, 2004, pp. 725-736.

Henry J. Zhang, "Modeling and Loop Compensation Design of Switching Mode Power Supplies", Application Note 149, Linear Technology, Jan. 2015, pp. 1-22.

Henry Zhang, "Modeling and Loop Compensation Design of Switching Mode Power Supplies, Part 1", EDN Network, Mar. 14, 2015, pp. 1-27.

Henry Zhang, "Modeling and Loop Compensation Design of Switching Mode Power Supplies, Part 2", EDN Network, Mar. 22, 2015, pp. 1-20.

| | PI (Gm amp) | TYPE-I | TYPE-II | TYPE-III |
|---|---|---|---|---|
| Circuit | | | | |
| Transfer Function | $\dfrac{G_m R_{f2}(1+sR_c C_c)}{sC_c(R_{f1}+R_{f2})}$ | $\dfrac{1}{sR_{f1}C_a}$ | $\dfrac{1+sR_a C_a}{sR_{f1}(C_a+C_b)}\left(1+\dfrac{sR_a C_a C_b}{C_a+C_b}\right)$ | $\dfrac{(1+sR_a C_a)(1+sC_F(R_F+R_{f1}))}{sR_{f1}(C_a+C_b)\left(1+\dfrac{sR_a C_a C_b}{C_a+C_b}\right)}(1+sR_F C_F)$ |
| $T(c)$ | $T(c) = R_{f1}*C_c + R_c*C_c$ (R_{f2} NOT INCLUDED AS R_{f2} CAN BE EXPRESSED IN TERMS OF $R_{f1}$, $V_{out}$, $V_{ref}$) | $T(c) = R_{f1}*C_a$ | $T(c) = R_a C_a + R_{f1} C_a + R_a C_b$ (TYPICALLY $C_b \ll C_a$) | $T(c) = R_a C_a + C_F R_f + R_{f1} C_f + R_{f1} C_a + R_a C_b$ (TYPICALLY $C_b \ll C_a$) |

| Auto | Manual |
|------|--------|
| ▼ Design Operating Point | |

Design Operating Point $V_{in}$ (V): 5    $I_{out}$ (A): 10    $V_{out}$ (V): 1

▼ Design Operating Values

|  | Min | Target | Max | Calculated |
|---|---|---|---|---|
| Phase Margin (deg) | 35 | 47 | 90 | 42.17 |
| Cross Over Frequency (Hz) | 16.67k | 50k | 100k | 50.61k |
| Low Frequency Gain (dB) | 50 | 50 | 50 | 80.33 |
| Gain Margin (dB) | -31 | -16 | -10 | -17.70 |

← 1002

1004 → Optimization Tuning

Robustness ⟵————⬥————⟶ Performance

Successful: Automatic Compensation Achieved!

▼ Compensation Components

|  | Name | Min | Max | Calculated |
|---|---|---|---|---|
| | $R_{c1}$ (Ohm) | 500 | 40k | 5.11k |
| | $C_{c1}$ (F) | 1n | 204n | 3.90n |
| 1006 → | $C_{c2}$ (F) | 1p | 5n | 330p |
| | $C_{c3}$ (F) | 1p | 5n | 2.70n |
| | $R_{c2}$ (Ohm) | 475 | 40k | 634 |

1008 → [Auto Compensate]    [Apply changes to design] ← 1010

Design History for Design #2513 (LM21215MHXINOPB 3.0V-5.0V to 1.00V @ 10.0A)

| Plot? | Load | Phase Margin (deg) | Cross Over Freq (Hz) | $R_{c1}$ (Ohm) | $C_{c1}$ (F) | $C_{c2}$ (F) | $C_{c3}$ (F) | $R_{c2}$ (Ohm) | $V_{in}$ (V) | $I_{out}$ (A) |
|---|---|---|---|---|---|---|---|---|---|---|
| ✗ ☑ 03 | Load | 42.17 | 50.61k | 5.11k | 3.00n | 330p | 2.70n | 634 | 5 | 10 |
| ✗ ☐ 02 | Load | 42.48 | 45.92k | 3.57k | 10n | 504p | 3.90n | 475 | 5 | 10 |
| ✗ ☐ 01 | Load | 43.26 | 36.45k | 6.98k | 47n | 224p | 1n | 3.01k | 5 | 10 |
| ✗ ☑ 00 | Load | 53.86 | 30.06k | 4.50k | 2.20n | 220p | 1n | 475 | 5 | 10 |

| Auto | Manual |

Design Operating Point

$V_{in}$ (V): 5   $I_{out}$ (A): 10   $V_{out}$ (V): 1

Design Operating Values

Phase Margin (deg)         53.06
Cross Over Frequency (Hz)  30.05k         ← 1102
Low Frequency Gain (dB)    85.18
Gain Margin (dB)           −51.08

Compensation Parameters

◉ Edit Components                             ○ Edit Poles/zeroes          (?)

| Name | Input | Calculated |
|---|---|---|
| $R_{c1}$ (Ohm) | 4.99k | 4.99k |
| $C_{c1}$ (F) | 2.20n | 2.20n |
| $C_{c2}$ (F) | 220p | 220p |
| $C_{c3}$ (F) | 1n | 1n  ↙ 1104 |
| $R_{c2}$ (Ohm) | 475 | 475 |

| Name | Input | Calculated |
|---|---|---|
| Gain (dB): | 92.32 | 92.32 |
| Zero 1 (Hz): | 14.50k | 14.50k |
| Zero 2 (Hz): | 15.19k | 15.19k |
| Pole 1 (Hz): | 0.00 | 0.00  ↘ 1106 |
| Pole 2 (Hz): | 159.47k | 159.47k |
| Pole 3 (Hz): | 336.05k | 336.05k |

1110 ─ [ Calculate ]   [ Apply changes to design ] ─ 1112

Design History for Design #2513 (LM21215MHXINOPB 3.0V-5.0V to 1.00V @ 10.0A)

| Plot? | Load | Phase Margin (deg) | Cross Over Freq (Hz) | $R_{c1}$ (Ohm) | $C_{c1}$ (F) | $C_{c2}$ (F) | $C_{c3}$ (F) | $R_{c2}$ (Ohm) | $V_{in}$ (V) | $I_{out}$ (A) |
|---|---|---|---|---|---|---|---|---|---|---|
| ✗ ☑ 01 | Load | 43.26 | 36.45k | 6.91k | 47n | 220p | 1n | 3.01k | 5 | 10 |
| ✗ ☐ 00 | Load | 53.06 | 30.06k | 4.93k | 2.20n | 220p | 1n | 475 | 5 | 10 |

TO FIG. 11B

FIG. 11A

COMPENSATION DESIGN OF POWER CONVERTERS

CROSS-REFERENCE TO RELATED APPLICATIONS

This application is a continuation of U.S. Non-Provisional patent application Ser. No. 15/217,963, filed Jul. 22, 2016, which claims benefit of U.S. Provisional Patent Application No. 62/196,204 filed Jul. 23, 2015, both are incorporated herein by reference in their entirety.

BACKGROUND OF THE DISCLOSURE

Field of the Disclosure

Embodiments of the present disclosure generally relate to design of power converters, and more specifically relate to compensation design of power converters.

Description of the Related Art

The design of a switching power converter is usually performed in two stages, power stage design and compensation design. Power stage design may include selection of the appropriate inductor and capacitor for the output filter, switching frequency, the power switches, the controller integrated circuit (IC), the input capacitor, and the input electromagnetic interference filter (if needed). The power stage design is typically based on requirements such as the input and output voltage, maximum output current, converter efficiency, total cost, footprint size, etc. Compensation design may include choosing the control topology and the feedback compensation network to meet loop specifications such as phase margin (PM), gain cross-over frequency (FCO), low frequency gain (LFG), and gain margin (GM). Compensation design for switching power converters can be a difficult and time consuming process requiring many manual iterations to find a design that meets all the desired loop specifications.

SUMMARY

Embodiments of the present disclosure relate to methods and systems for compensation design of power converters. In one aspect, a method for compensation network design in a power converter design system is provided that includes computing optimal values for compensation components in a compensation network based on a plurality of loop specifications comprising crossover frequency (Fco), phase margin (PM), Gain Margin (GM), and low frequency gain (LFG), and applying changes to a power converter design comprising the compensation network based on the optimal values.

In one aspect, a power converter design system is provided that includes a component database storing data regarding bill of materials (BOM) passive components suitable for use in a compensation network, a power converter design tool configured to generate a power converter design comprising a compensation network, and a compensation design tool configured to provide a redesign of the compensation network, the redesign including selection of BOM passive components for compensation components of the compensation network from the component database based on compensation values for the compensation components computed by the compensation redesign tool.

BRIEF DESCRIPTION OF THE DRAWINGS

Particular embodiments will now be described, by way of example only, and with reference to the accompanying drawings:

FIG. 3 shows examples of four commonly use compensation types with corresponding ideal transfer functions and RC time constants;

FIGS. 10A-10C and 11A-11C show example graphical user interfaces (GUI);

DETAILED DESCRIPTION OF EMBODIMENTS OF THE DISCLOSURE

Figure 1:
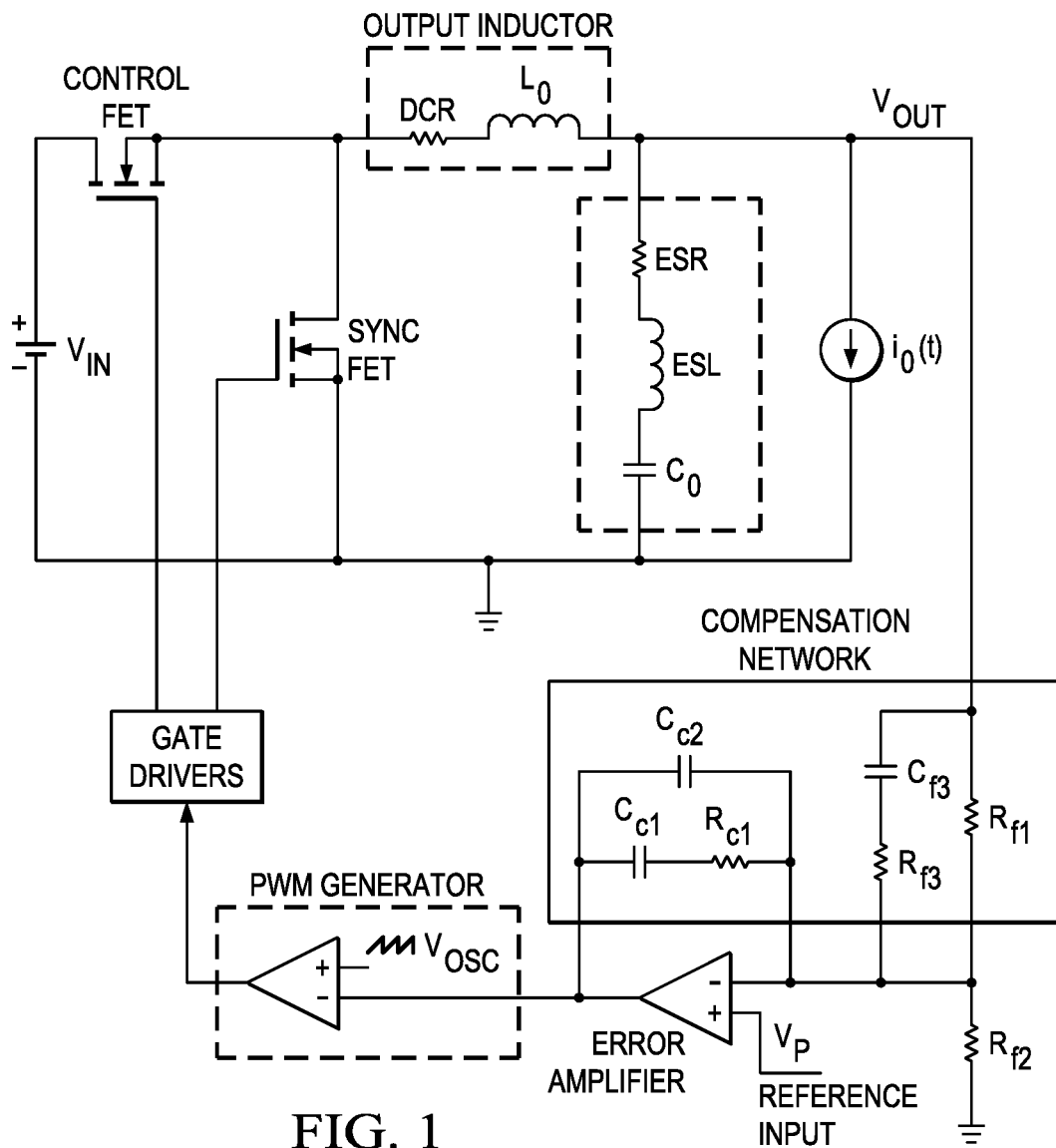
FIG. 1 is an example design of a voltage mode controlled power converter.

Specific embodiments of the disclosure will now be described in detail with reference to the accompanying figures. Like elements in the various figures are denoted by like reference numerals for consistency.

As previously mentioned, compensation design for switching power converters can be a difficult and time consuming process. A poorly designed compensation network can lead to unstable operation possibly resulting in undesired oscillations in output voltage, audible noise from the inductor and capacitors, over heating of the switches, inductor and output capacitor, reduced life of the power supply, and damage to the circuits powered by the converter. Performing compensation design manually is not only time consuming, but is also prone to inaccuracies as key design parameters such as operational amplifier (Op Amp) bandwidth and finite open loop gain or converter parasitics are typically ignored to simplify the design equations. Manually ensuring that a compensation design performs well across the entire operating range and power stage component variations of a power converter design is not trivial.

Embodiments of the disclosure provide methods and systems for compensation design in power converter designs that require a compensation network, e.g., switching power converters. Embodiments are directed to designing compensation networks for voltage mode control designs and current mode control designs. In voltage mode control and current mode control designs, output voltage and/or inductor current is used in the feedback loop to regulate the output voltage to the desired value. The current loop is referred to as the inner loop and the voltage loop is referred to as the outer loop. A compensation network is used in the outer loop in both voltage mode control and current mode control designs. In general, the control mode is chosen based on the particular controller integrated circuit used in the power converter design.

Some aspects of the disclosure have been described in S. Pam, et al., "A Web-based Tool for Compensation Design of Power Converters using Hybrid Optimization," Proceedings of 2016 IEEE Applied Power Electronics Conference and Exposition, March 20-24, 2016, Long Beach, Calif., pp. 3266-3272, which is incorporated by reference herein.

Figure 2:
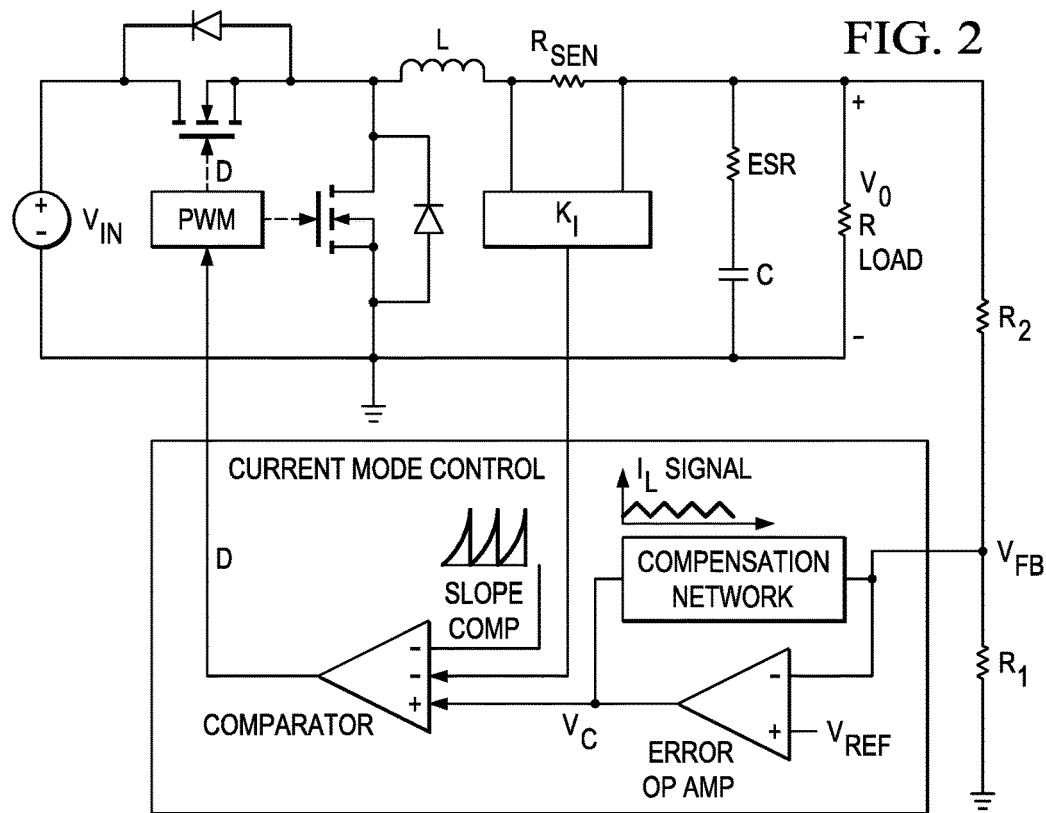
FIG. 2 is an example design of a current mode controlled power converter.

FIG. 1 is an example design of a voltage mode controlled power converter, i.e., a voltage mode controlled buck converter. In this example design, there is no current loop and only the output voltage is used in the feedback loop. The compensation network is in the voltage loop. FIG. 2 is an example design of a current mode controlled power converter, i.e., a current mode controlled buck converter. In this example design, the feedback loop includes both a current loop and a voltage loop. The compensation network is in the voltage loop. The depicted design is an example of peak current mode control. Other variants of current mode control include valley current mode and emulated current mode. The variants differ in how the current is sensed (or reconstructed).

In some embodiments, optimal values (parameters) for the resistors and capacitors in a compensation network are determined by applying a hybrid optimization method to minimize an objective function. The hybrid optimization method is described below in reference to FIG. 4. The key challenge for compensation design using optimization is formulation of a proper objective function that can be minimized to determine optimal values for the components in a compensation network. A simple formulation that meets the desired loop specifications of a power converter, e.g., crossover frequency (Fco), phase margin (PM), Gain Margin (GM), and low frequency gain (LFG), at a single operating point may not be sufficient to guarantee a robust compensation network design as meeting the loop specifications at a single operating point does not guarantee stability or performance over a full operating range of input voltage and output current. Instead, target, minimum, and maximum values of the loop specifications should be considered in the objective function and the loop specifications should lie within the minimum and maximum values for the entire range of operating points of the power converter, i.e., for the full range of input voltage and output current. These values may be chosen based, for example, on meeting constraints described in Table 1, the particular converter integrated circuit (IC) used, the power stage design, the frequency of operation, switching frequency, system dominant pole, the right-half-plane (RHP) zero if any, error amplifier gain/bandwidth limitations, and/or other factors known to those of ordinary skill in the art.

TABLE 1

| Specification | Description |
| --- | --- |
| Load Regulation | Maximum variation in steady state output voltage for a given load current variation. This is considered in determining the minimum low frequency gain (LFG). |
| Line Regulation | Maximum variation in steady state output voltage for a given change in input voltage. This considered in determining the minimum LFG. |
| Overshoot | Maximum deviation of output voltage from steady state during load or line transient. This determines the minimum crossover frequency (Fco). |

TABLE 1-continued

| Specification | Description |
| --- | --- |
| Settling Time | The time taken to come back to steady state during load or line transient. This determines the maximum RC time constraints of the compensation network components. |
| Ringing | Steady or slowing decaying oscillations in output voltage during load and line transients. This determines the phase margin (PM) |
| Noise Rejection | The closed loop system needs to have sufficiently low gain at higher frequencies. This determines the maximum Fco. |

The objective function $O(c)$ is given by $$O(c)=Se(c)+T_{RC}(c)+S_{PM}(c)+P(c)$$

where $c=[Rc_1, Cc_1, Rc_2, Cc_2]$ are the compensation parameters of the components in the compensation network. For example, for the example power converter of FIG. 1, $c=[Rc_1, Cc_1, Rf_1, Cc_2, Rf_3, Cf_3]$. In the above equation, $Se(c)$ is the sum of the weighted square errors of the loop specifications, $T_{RC}(c)$ is the sum of the weighted resistor-capacitor (RC) time constants of the compensation network, $S_{PM}(c)$ is the weighted slope of the phase curve at the gain cross-over frequency, and $P(c)$ is the penalty function. $Se(c)$ is used to meet the target loop specifications at the nominal operating point, $T_{RC}(c)$ is used to minimize the transient settling time for load and line transients, $S_{PM}(c)$ is used to improve the robustness of the solution with respect to small perturbations in the power stage component parameters, and $P(c)$ is used to ensure that the design remains within desired specification limits over the entire operating range of the converter.

The sum of the weighted square errors of the loop specifications $Se(c)$ is given by $$Se(c)=w_{PM}\times(PM(c)-PM_{spec})^2+w_{Fco}\times(Fco(c)-Fco_{spec})^2+w_{GM}\times(GM(c)-GM_{spec})^2 w_{LFG}\times(LFG(c)-LFG_{spec})^2$$

where $PM_{spec}$, $Fco_{spec}$, $GM_{spec}$, and $LFG_{spec}$ are the target values for PM, Fco, GM, and LFG.

The sum of the weighted RC time constants of the compensation network $T_{RC}(c)$ is given generically by $$T_{RC}(C)=w_1\times RC_1\times Cc_1+w_2\times Rc_2\times Cc_2$$

where $Rc_1$ and $Cc_1$ are an RC circuit in the compensation network and $Rc_2$ and $Cc_2$ are an RC circuit in the compensation network. The RC time constant (in seconds) of an RC circuit is equal to the product of the circuit resistance in ohms and the circuit capacitance in farads. The above equation differs depending on the particular compensation network. The time constants for a particular compensation network are taken from the dominant time constants in the compensation transfer function equations. FIG. 3 shows examples of four commonly used compensation types, i.e., proportional integral (PI) Type-I, Type-II, and Type-III, along with the corresponding ideal transfer functions and RC time constants for each. In these examples, the PI compensation example assumes a transconductance amplifier and the other examples assume a voltage amplifier.

The weighted slope of the phase curve at the gain cross-over frequency $S_{PM}(c)$ is given by $$S_{PM}(c) = w_s \frac{dPM(c)}{df}\bigg|_{f=F_{CO}}.$$

The penalty function P(c) is given by $$P(c) = \sum_{vin}\sum_{Iload} H(PM_{min} - PM(c))(e^{\gamma_1(PM_{min}-PM(c))} - 1) +$$
$$\sum_{vin}\sum_{Iload} H(PM(c) - PM_{max})(e^{\gamma_1(PM(c)-PM_{max})} - 1) +$$
$$\sum_{vin}\sum_{Iload} H(Fco_{min} - Fco(c))(e^{\gamma_2(Fco_{min}-Fco(c))} - 1) +$$
$$\sum_{vin}\sum_{Iload} H(Fco(c) - Fco_{max})(e^{\gamma_2(Fco(c)-Fco_{max})} - 1) +$$
$$\sum_{vin}\sum_{Iload} H(LFG_{min} - LFG(c))(e^{\gamma_3(LFG_{min}-LFG(c))} - 1) +$$
$$\sum_{vin}\sum_{Iload} H(LFG(c) - LFG_{max})(e^{\gamma_3(LFG(c)-LFG_{max})} - 1) +$$
$$\sum_{vin}\sum_{Iload} H(GM_{min} - GM(c))(e^{\gamma_4(GM_{min}-GM(c))} - 1) +$$
$$\sum_{vin}\sum_{Iload} H(GM(c) - GM_{max})(e^{\gamma_4(GM(c)-GM_{max})} - 1)$$

where H(x) is the unit step function such that H(x)=0 if x≤0 and H(x)=1 if x≥0. The penalty function includes an exponential penalty to the objective function when the specification goes lower than the minimum limit or greater than the maximum limit over the given load current Iload and input voltage vin range. Minimum, nominal and maximum values of voltage and current are used for summation over vin and Iload.

The weights in the above equations provide for trading off performance and robustness. When more robustness is desired, the weights applied to PM and GM functions, i.e., $w_{PM}$ and $w_{GM}$, as well as the weight for the slope of the phase curve at Fco, i.e., $w_s$, can be set to higher values. When better performance is desired, the weights applied to the Fco functions, i.e., $w_{Fco}$, and the LFG functions, i.e., $w_{LFG}$, can be set to higher values. Thus, when better performance is desired, the minimization of the objective function attempts to achieve results closer to the target Fco and LFG and when higher robustness is desired, the minimization of the objective function attempts to achieve results closer to the target PM and GM.

The functions PM(c), Fco(c), LCG(c), and GM(c) compute the respective loop specifications for the compensation parameters using a loop-gain model, i.e., a transfer function representation, of the power converter design containing the compensation network. A loop-gain model is used to understand the stability and performance of the power converter design. A loop-gain model may also be referred to, for example, as a small signal model or an averaged model or a linear model of the power converter. In general, a loop-gain model is a function that defines how gain and phase of the loop vary with frequency where the gain crosses zero decibels (0 dB). From this relation of phase and gain versus frequency, values of the loop specifications can be derived.

In general, a loop-gain model for a power converter integrated circuit (IC) is derived based on the topology, e.g., buck, buck-boost, or boost, control mode, e.g., voltage mode or current mode, and compensation type, e.g., Type-I, Type-II, or Type-III, of the design. In various embodiments, the loop-gain model for a power converter design is derived including power stage parasitics and non-ideal behavior of the feedback amplifier used. As is well known, an ideal voltage amplifier will have infinite gain, zero output impedance, infinite input impedance and infinite bandwidth, i.e., infinite gain over all frequencies, and an ideal transconductance amplifier will have infinite input and output impedance, infinite bandwidth and finite Gm, and infinite slew rate. Actual voltage and transconductance amplifiers deviate from this ideal behavior, i.e., will have non-ideal behavior. That is, an actual voltage amplifier will have finite gain, finite input impedance, non-zero output impedance, and finite bandwidth. Similarly, an actual transconductance amplifier will have finite input impedance and finite output impedance and finite bandwidth and finite slew rate.

The inclusion of power stage parasitic and feedback amplifier non-idealities results in a complicated loop-gain model with high order transfer functions. As a result, such loop-gain models are not typically used in current practice. Rather, highly simplified models are used to derive compensation component values. The use of the more complex loop-gain models provides for better accuracy in deriving the compensation component values.

Any suitable approach may be used to derive a loop-gain model. One suitable approach is the unified model approach described, for example, in F. D. Tan and R. D. Middlebrook, "A Unified Model for Current-Programmed Converters," IEEE Transactions on Power Electronics, Vol. 10, No. 4, July, 1995, pp. 397-408 and S. S. Hong, et al., "The Unified Model for Current-Mode Control: An Alternative Derivation," Journal of Circuits, Systems, and Computers, Vol. 13, No. 4, August, 2004, pp. 725-736. Other examples of suitable approaches are described in "Understanding Buck Power States in Switch Mode Power Supplies," Texas Instruments, Inc., March, 1999, pp. 1-36, and R. Sheehan, "Understanding and Applying Current-Mode Control Theory: Practical Design Guide for Fixed-Frequency, Continuous Conduction-Mode Operation," Power Electronics Technology Exhibition and Conference, Dallas, Tex., October 30-Nov. 1, 2007, pp. 1-30.

Figure 4:
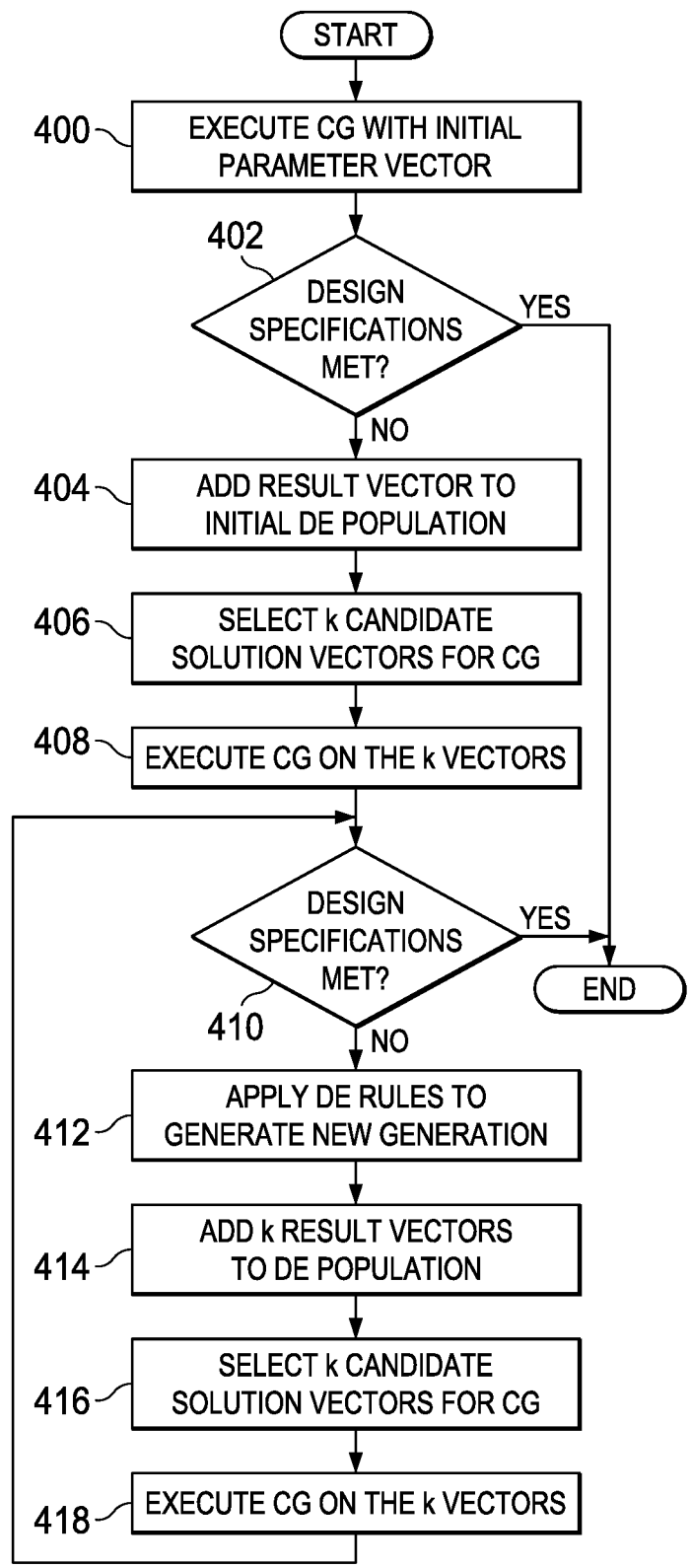
FIG. 4 is a flow diagram of a hybrid optimization method for determining optimal values for components in a compensation network.

FIG. 4 is a flow diagram of a hybrid optimization method that minimizes the objective function O(c) to find optimal values for the components in a compensation network. In general, the hybrid optimization method combines a differential evolution (DE) algorithm and a conjugate gradient (CG) algorithm as suggested in K. Bandurski and W. Kwedlo, "A Lamarckian Hybrid of Differential Evolution and Conjugate Gradients for Neural Network Training," Neural Processing letters, Vo. 32, Issue 1, August 2010, pp. 31-44, "Bandurski" herein, which is incorporated by reference herein.

Descriptions of the conjugate gradient algorithm and the differential evolution algorithm used in some embodiments are provided below. Detailed descriptions of conjugate gradient algorithms and differential evolution algorithms may be found, for example, in Bandurski, S. Rao, "Engineering Organization Theory and Practice," John Wiley & sons, Inc., Hoboken, N.J., 2009, pp. 319-345, and K. Price, et al., "Differential Evolution A Practical Approach to Global Optimization," Springer-Verlag Berlin Heidelberg, Germany, 2005, pp. 37-47. In general, DE optimizes the problem by maintaining a population of candidate solutions and creating new candidate solutions by combining current solutions using a formula. The solutions with better scores according to some criteria are retained and new candidate solutions are iteratively formed. DE converges to global optima even in the presence of local optimum points and noise. However, DE is slow to converge as compared to gradient based algorithms. CG is faster to converge but may give erroneous results in the presence of noise and/or by converging to local minima. Combining DE with CG as in the method of FIG. 4, where CG is applied to some of the candidate solutions of DE to arrive at new candidate solutions, may result in faster convergence to the solution.

The conjugate gradient algorithm operates as follows to minimize an objective function $f(x)$ where x is a vector of parameters, e.g., the compensation parameters of the above described objective function. Given an initial guess $x_0$ as to the solution of an objective function $f(x)$, a next guess $x_1$ to the solution is found as given by $$x_1 = x_0 + \alpha_0 s_0$$

where $\alpha_0$ is the initial step size as given by $$\alpha_0 = \arg\min f(x_0 + \alpha s_0)$$

and $s_0$ is the initial descent direction given by $$s_0 = \Delta x_0 = -\nabla_x f(x_0)$$

where the gradient $\nabla_x f(x)$ is computed as per $$\nabla_x f(x) = \left[ \frac{\partial f}{\partial x_1}, \frac{\partial f}{\partial x_2} \cdots \frac{\partial f}{\partial x_m} \right].$$

In the above equations, $\alpha$ is a scalar variable. Further, $x_0 + \alpha s_0$ represents a line passing through $x_0$ in the direction specified by $s_0$ and is the value of $\alpha$ for which $f(x_0 + \alpha s_0)$ is minimum. The partial derivatives $$\frac{\partial f}{\partial x_i}$$

for i=1 to m, are computed numerically by varying one parameter at a time, where m is the number of parameters of the objective function. Thus the gradient computation involves m evaluations of the objective function.

Each subsequent guess $x_{n+1}$ is determined iteratively as given by $$x_{n+1} = x_n + \alpha_n s_n$$

where $s_n$ is the conjugate gradient descent direction given by $$s_n = \Delta x_n = -\nabla_x f(x_n + \beta_n s_{n-1}),$$

and $\alpha_n$ is the step size (length) given by $$\alpha_n = \arg\min f(x_n + \alpha s_n),$$

and $\beta_n$ is the coefficient governing the proportion of the previous search direction in the current search direction and is given by $$\beta_n = \max\left(0, \frac{\Delta x_n^T (\Delta x_n - \Delta x_{n-1})}{(\Delta x_{n-1})^T \Delta x_{n-1}}\right).$$

The iterative process is terminated when any of the following conditions is true: 1) the change in the objective function in two consecutive iterations is small; 2) the partial derivatives of the gradient computation are small; 3) the change in the parameter vector in two consecutive iterations is small; and 4) a maximum number of iterations have been performed. The first condition may be computed as given by $$\left| \frac{f(x_n) - f(x_{n-1})}{f(x_n)} \right| \leq \epsilon_1.$$

The second condition may be computed as given by $$\left| \frac{\partial f}{\partial x_i} \right| \leq \epsilon_2, i = 1, 2, \ldots m$$

where xi are the current parameter values.

The third condition may be computed as given by $$\frac{|x_n - x_{n-1}|}{|x_n|} \leq \epsilon_3$$

The change thresholds $\epsilon_1$, $\epsilon_1$, $\epsilon_1$ are chosen to be small values, e.g., in the range of 1 e-2 to 1 e-4.

Note that in the above description, the step size is found from a line search. Further, the gradient computation to find the gradient descent direction includes a small perturbation of the current solution $x_n$ and computing the objective function with the result. One of ordinary skill in the art will understand that other approaches for finding the step size and/or the direction of descent may be used.

Figure 5:
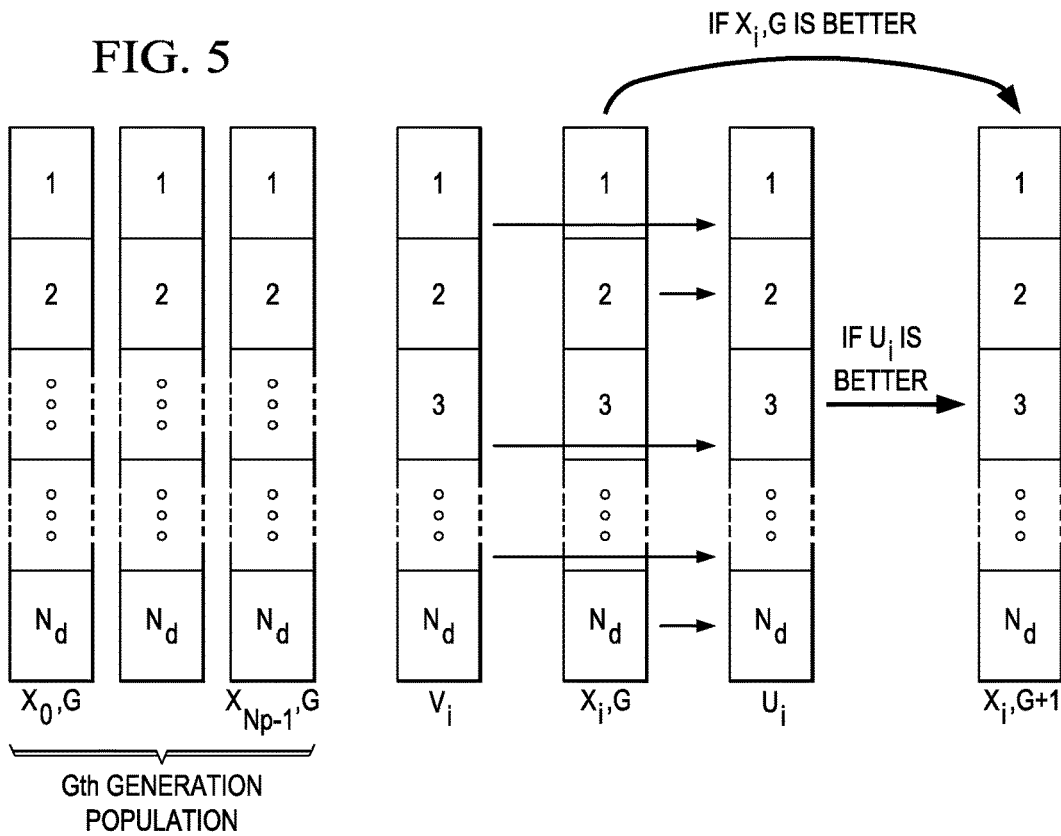
FIG. 5 is an example illustrating differential evolution (DE)

FIG. 5 illustrates the operation of the DE algorithm. DE begins with an initial generation of $N_p$ candidate solution vectors for the objective function that are collectively referred to as a population. The values in the candidate solution vectors may be chosen, for example, randomly and/or according to the problem being solved. The value of $N_p$ may be chosen based on factors such as the problem size and complexity. A population is evolved from generation to generation, i.e., iteratively, according to defined rules for how the vectors in the population change from generation to generation. The example in FIG. 5 illustrates the evolution of a Gth generation population of $N_p$ candidate solution vectors of length $N_d$ to the generation G+1.

To determine the vector population for generation G+1, $N_p$ trial vectors $V_i$ of length $N_d$ are generated as per $$V_i = X_{r1}, G + F^*(X_{r2}, G - X_{r3}, G)$$

where r1, r2, and r2 are mutually exclusive random numbers less than Np and F is a parameter similar to the step size parameter $\alpha$ in the CG algorithm. The value of F is typically less than one and is chosen based on the convergence properties of the objective function being evaluated and the number of parameters. The trial vectors $V_i$ are then "crossed over" with corresponding vectors $X_i$,G in generation G to generate $N_p$ cross vectors $U_i$, i.e., selected elements of $V_i$ and $X_i$,G are used to create $U_i$. In this example, $U_i$ is formed by taking alternating elements of a trial vector $V_i$ and the corresponding vector $X_i$,G. Finally, either $U_i$ or $X_i$,G is selected to become $X_i$,G+1 in generation G+1, depending on which vector is the better candidate solution vector, i.e., which one has the smaller value of the objective function. If both vectors have the same function value, either can be selected. In this latter case, in some embodiments, the new vector $U_i$ is selected.

Referring again to FIG. 4, the method assumes a current power converter design with a compensation network that needs to be redesigned, e.g., due to a component change in the power converter design that compromised the stability of the compensation network. Thus, the compensation parameters to be found are for the components in the existing compensation network. The method further assumes that values for $PM_{spec}$, $Fco_{spec}$, $GM_{spec}$, $LFG_{spec}$, $PM_{min}$, $Fco_{min}$, $GM_{min}$, $LFG_{min}$, $PM_{max}$, $Fco_{max}$, $GM_{max}$, $LFG_{max}$, and the various weights in the objective function have been determined as well as values for the target, minimum, and maximum vin and iload. Determination of these values is discussed herein in reference to FIG. 6.

The method begins by executing 400 CG with an initial parameter vector with an entry for each component in the current compensation network. The initial parameter vector may contain the values of the components in the current compensation network or other suitable parameter values may be used. The CG algorithm is executed until one of the previously described four conditions is met. The maximum number of iterations allowed by the fourth condition is managed such that maximum is small to try to avoid termination at a local minimum. In some embodiments, the maximum number of iterations is the bounded by time, i.e., CG is allowed to iterate for a specified amount of time, e.g., five seconds, provided none of the other conditions are met.

A check is then made to determine 302 if the design specifications have been met, i.e., that the loop specifications computed for the vector c are within the respective ranges. Two conditions may be considered to decide if the design specifications have been met: 1) PM(c), GM(c), Fco(c), and LFG(c) should lie between the respective minimum and maximum limits, where c is the parameter vector resulting from execution of the CG algorithm; and 2) the value of O(c) should be minimum at c (the current selected compensation component values). For the latter criteria, O(c) is compared to a small delta value. If O(c) is less than the delta, then the minimum of O(c) has been met. The delta may be, for example, in the range of 1 e-6. Note that the objective function is defined such that the result of evaluating the function is always greater than 0.

The design specifications are determined to be met if the value of O(c) is less than the delta, Further, the first condition is also true because the penalty function P(c) of O(c) adds a large penalty if any of PM(c), GM(c), Fco(c), and LFG(c) are outside the respective minimum and maximum limits. The design specifications are also determined to be met if the first condition is true and the value of O(c) is greater than the delta but not reducing further after several iterations. If the design specifications are met 402, the method terminates as compensation parameters for the compensation network have been computed.

If the design specifications are not met 402, then DE is performed. For the initial DE execution, the single result vector from executing the CG algorithm with the initial parameter is added 404 to an initial DE population of $N_p-1$ candidate solution vectors of length $N_d$, where $N_d$ is the number of compensation parameters. The value of $N_p$ may be chosen based on the number of compensation parameters. For example, if there are two compensation parameters, a small value of $N_p$ may be used, e.g., $N_p=10$ while if there are six compensation parameters, a larger value of $N_p$ may be used, e.g., $N_p=50$.

Each candidate solution vector in the initial DE population of $N_p-1$ candidate solution vectors is populated with randomly selected values within a given range of values. For example, in some embodiments, the range is 100 Ohm to 100 k Ohm for resistors and 10 pF to 100 nF for capacitors. The single result vector from executing the CG algorithm is added to the $N_p-1$ candidate solution vectors to form the full DE population of $N_p$ vectors. From this initial population, k random candidate solution vectors are selected 406 for CG processing. The selected k vectors are also removed from the DE population, leaving a population of $N_0-k$ vectors. The value of k is chosen as a percentage of the total population, e.g., 10% to 20%. In practice, the values of $N_p$ in relation to the number of parameters and the values of k in relation to the total population size may be determined empirically.

The CG algorithm is then executed 408 for each of the k candidate solution vectors, resulting in k modified candidate solution vectors. A check is then made to determine 410 if the design specifications have been met by any of the k modified candidate solution vectors. If the design specifications have been met 410, the method terminates and the solution returned. As previously mentioned, two conditions may be considered to decide if the design specifications have been met: 1) PM(c), GM(c), Fco(c), and LFG(c) should lie between the respective minimum and maximum limits, where c is the parameter vector resulting from execution of the CG algorithm; and 2) the value of O(c) should be minimum at c (the current selected compensation component values). The design specifications are determined to be met if the value of O(c) is less than the delta for any of the k modified candidate solution vectors.

The design specifications are also determined to be met if the first condition is true and the value of O(c) is greater than the delta but not reducing further after several iterations. To determine if the value of O(c) is not reducing further, the value of O(c) for the best candidate solution vector from the previous iteration is compared to the value of O(c) for the best candidate solution vector resulting from the current iteration. If two or more vectors meet the design specifications, the vector for which O(c) is minimum is chosen for the solution. In the best case, the k candidate solution vectors converge to a single vector.

If the design specifications are not met 410, DE is performed again. First, the above described DE rules are applied 412 to the $N_p-k$ candidate solution vectors of the current generation to generate a new generation with a population of $N_p-k$ candidate solution vectors. The k modified candidate solution vectors, i.e., the result vectors, from executing the CG algorithm are then added 414 to the population of the new generation to form the full DE population of $N_p$ vectors. From this population, k random candidate solution vectors are selected 416 for CG processing. The selected k vectors are also removed from the DE population, leaving a population of $N_p-k$ vectors.

The CG algorithm is then executed 418 for each of the k candidate solution vectors, resulting in k modified candidate solution vectors. The check is then made to determine 410 if the design specifications have been met by any of the k modified candidate solution vectors. Steps 410-418 are repeated until the design specifications are met, or until an allotted amount of execution time, e.g., 15 seconds, for finding a solution has been reached (not specifically shown in FIG. 4). In some embodiments, if the allotted amount of execution time is reached, a candidate solution vector is returned as the solution provided PM(c), GM(c), Fco(c), and LFG(c) lie between the respective minimum and maximum limits. Otherwise, a timeout error is indicated.

Figure 6:
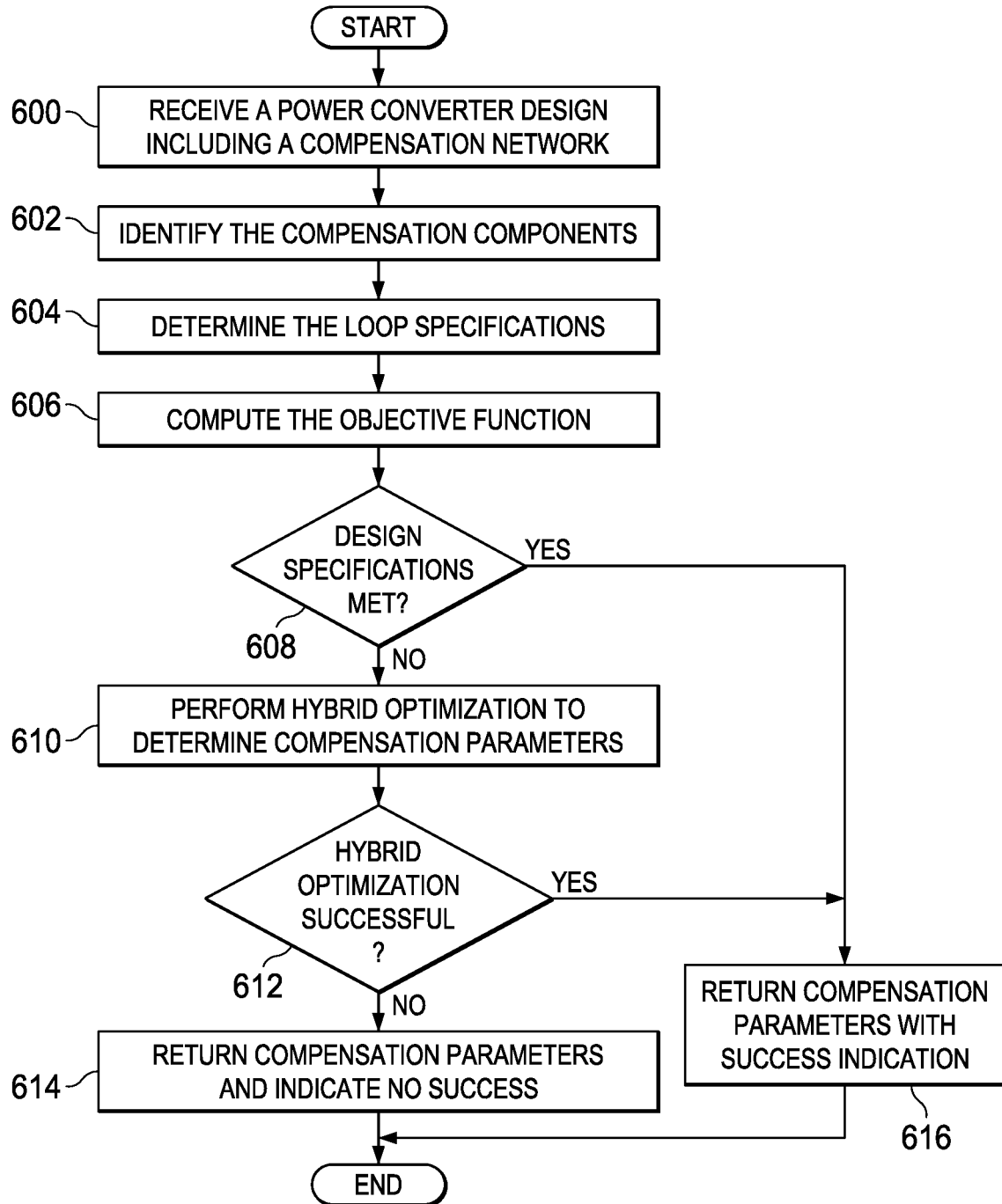
FIG. 6 is a flow diagram of a method for computing compensation parameters using an embodiment of the method of FIG. 4.

FIG. 6 is a flow diagram of a method for computing compensation parameters in a power converter design system using an embodiment of the hybrid optimization method of FIG. 4. This method may be performed, for example, when a change is made to an existing power converter design necessitating new compensation parameters for the compensation network or if the designer desires to further optimize the compensation network in an existing power converter design.

The method begins with receiving 600 a power converter design generated using the power converter design system that includes a compensation network. The parameters of the compensation network in the power converter design may have been determined during the initial design of the power converter using standard compensation design equations, based on, for example, K-factor based design equations or simple pole-zero placement, are used for the initial design. The power converter design may include all of the bill of material (BOM) components in the design, the loop-gain model, all operating values, information regarding how each component is connected to others in the design, information regarding how each parameter such as converter efficiency changes with different input conditions, etc.

The compensation components of the compensation network are then identified 602 as the number of compensation components in the network and the type of each component are needed to evaluate the objective function. Further, the connectivity of the components is needed to determine proper ranges for the components. The compensation components may be identified based on information in the power converter design and rules derived from knowledge of compensation components and their connectivity in different types of compensation. For example, most designs fall into one of two categories: 1) the error amplifier is a voltage amplifier; or 2) the error amplifier is a transconductance amplifier. Identification of compensation components for these two design categories is described in reference to FIGS. 7, 8A, and 8B. Designs that do not fall into one of these categories may be handled on a case by case basis.

Figure 7:
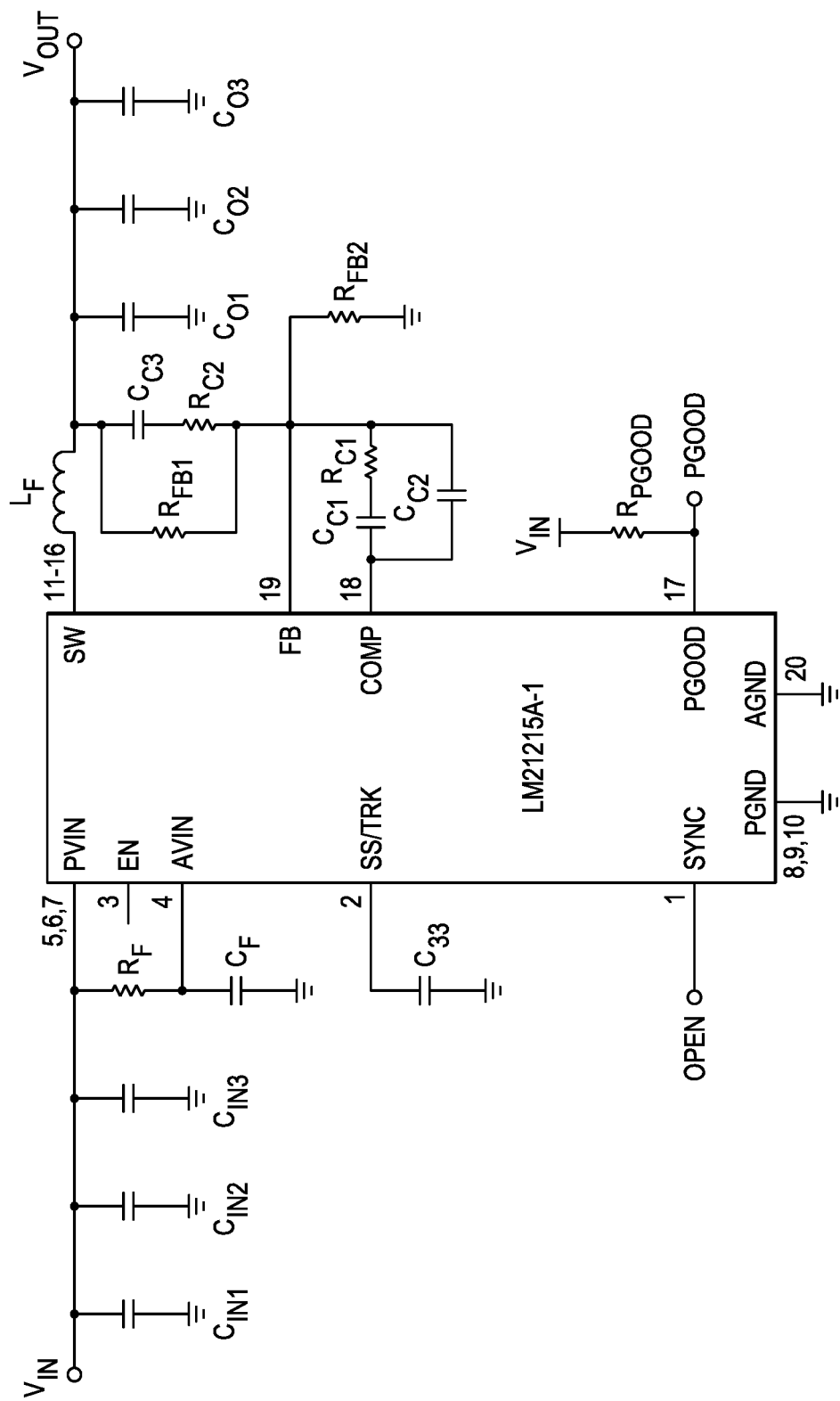
FIG. 7 shows an example power converter design in which the error amplifier is a voltage amplifier.

FIG. 7 shows an example power converter design in which the error amplifier is a voltage amplifier. In this example, the controller IC is the LM21215A, a synchronous buck DC-DC converter available from Texas Instruments, Inc. A detailed description of this IC is available in "LM2125A 15-A Ultra High-Efficiency Synchronous Buck Converter With Frequency Synchronization," Texas Instruments, Inc., March, 2011, revised January, 2016, pp. 1–38. In this example, the COMP pin of the IC is the error amplifier output, the FB pin in the IC is the feedback input, and Vout is the output voltage pin of the converter. To determine the compensation components in the compensation network, all components connected between Comp and FB and between FB and Vout are identified, i.e., $C_{c1}$, $R_{c1}$, $C_{c2}$, $R_{c2}$, $C_{c3}$, and $R_{FB1}$.

Figure 8A:
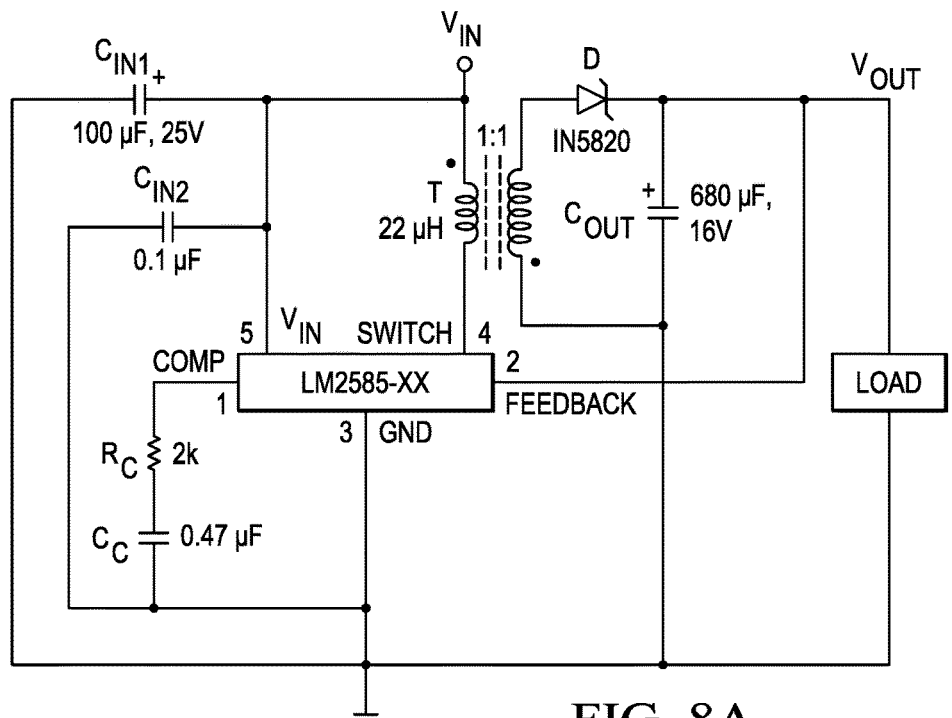
FIGS. 8A and 8B show example power converter designs in which the error amplifier is a transconductance amplifier.
Figure 8B:
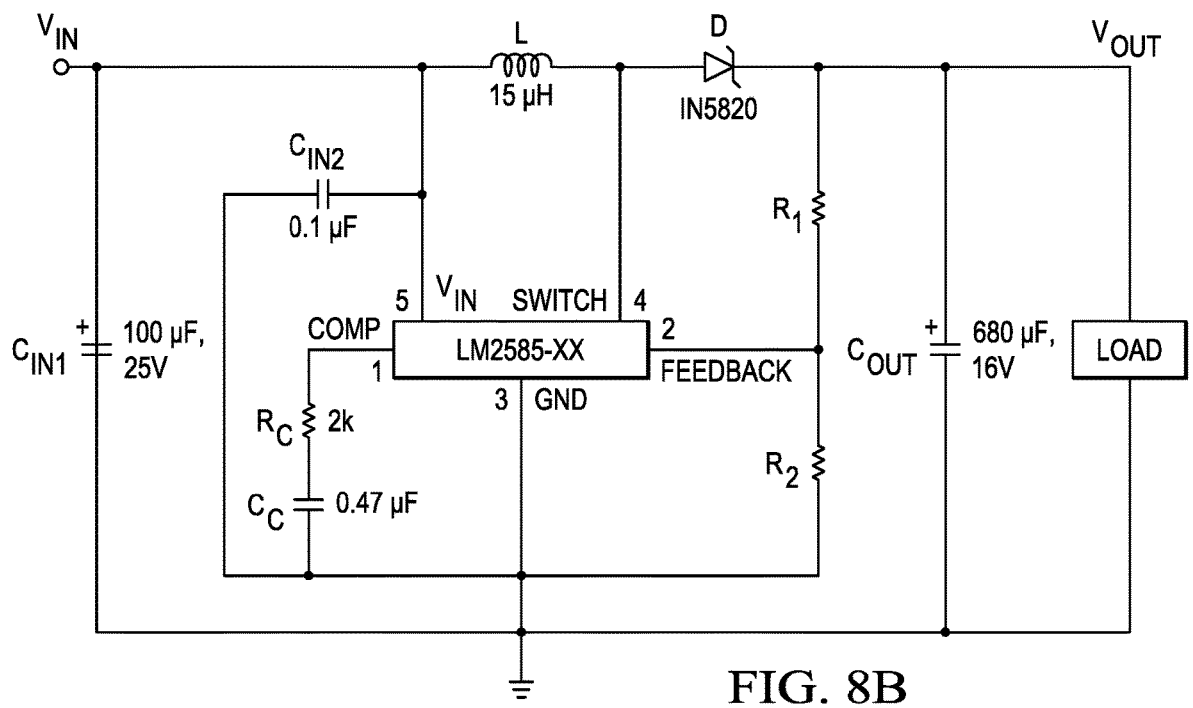

FIGS. 8A and 8B show example power converter designs in which the error amplifier is a transconductance amplifier. In these examples, the controller ICs are from the LM2585 series of flyback regulators available from Texas Instruments, Inc. A detailed description of this family of ICs is available in "LM2585 Simple Switcher® 3A Flyback Regulator," Texas Instruments, Inc., April, 2000, revised April, 2013, pp. 1–32. To determine the compensation components in the compensation network, all components connected between Comp and Gnd and Feedback and Vout are identified. In FIG. 8A, Feedback and Vout are shorted, with nothing connected between these pins. In this case, the compensation components are $R_c$ and $C_c$. In FIG. 8B, the compensation components are $R_c$, $C_c$, and R1.

Referring again to FIG. 6, the method continues with determination 604 of the loop specifications for the power converter design, i.e., the target, minimum, and maximum values of PM, Fco, GM, and LFG. Factors considered in determining these values are previously described herein. The values are computed according to suitable rules derived from the practice and experience of power converter designers. Such rules are familiar to one of ordinary skill in the art.

The objective function O(c) is then computed 606 where c is the values of the identified compensation network components. A determination 608 is then made based on the result of computing the object function as to whether or not the compensation parameters meet the design specifications. More specifically, if the result of computing O(c) is less than a small delta value, e.g., in the range of 1 e-6, then the design specifications are met by current compensation parameters and the method terminates, returning 616 the compensation parameters with an indication that the compensation parameters meet the design specifications.

Otherwise, the design specifications are not met and hybrid optimization as per an embodiment of the method of FIG. 4 is performed 610 to attempt to determine compensation parameters for the compensation network that meet the design specifications. If the hybrid optimization is successful 612 in determining compensation parameters that meet the design specifications, the method terminates, returning 616 the compensation parameters with an indication that the compensation parameters meet the design specifications. Otherwise, the method terminates, returning 618 the compensation parameters with an indication that the compensation parameters do not meet the design specifications.

In some embodiments, the above method may be used to provide a fully automated "one-click" compensation design as all the information need to compute compensation parameters that meet the design specifications is automatically generated without any need for user input. In some embodiments, after the loop specifications are determined, user modifications may be accepted before performing the remainder of the method. For example, a user of the power converter design system may be given the opportunity to modify the computed loop specifications, the compensation component values, and/or indicate the relative importance of robustness versus performance prior to performing the remaining steps of the method. Any suitable user interface may be used to accept user input. An example of a suitable user interface is described below in reference to FIGS. 10A-10C.

Figure 9:
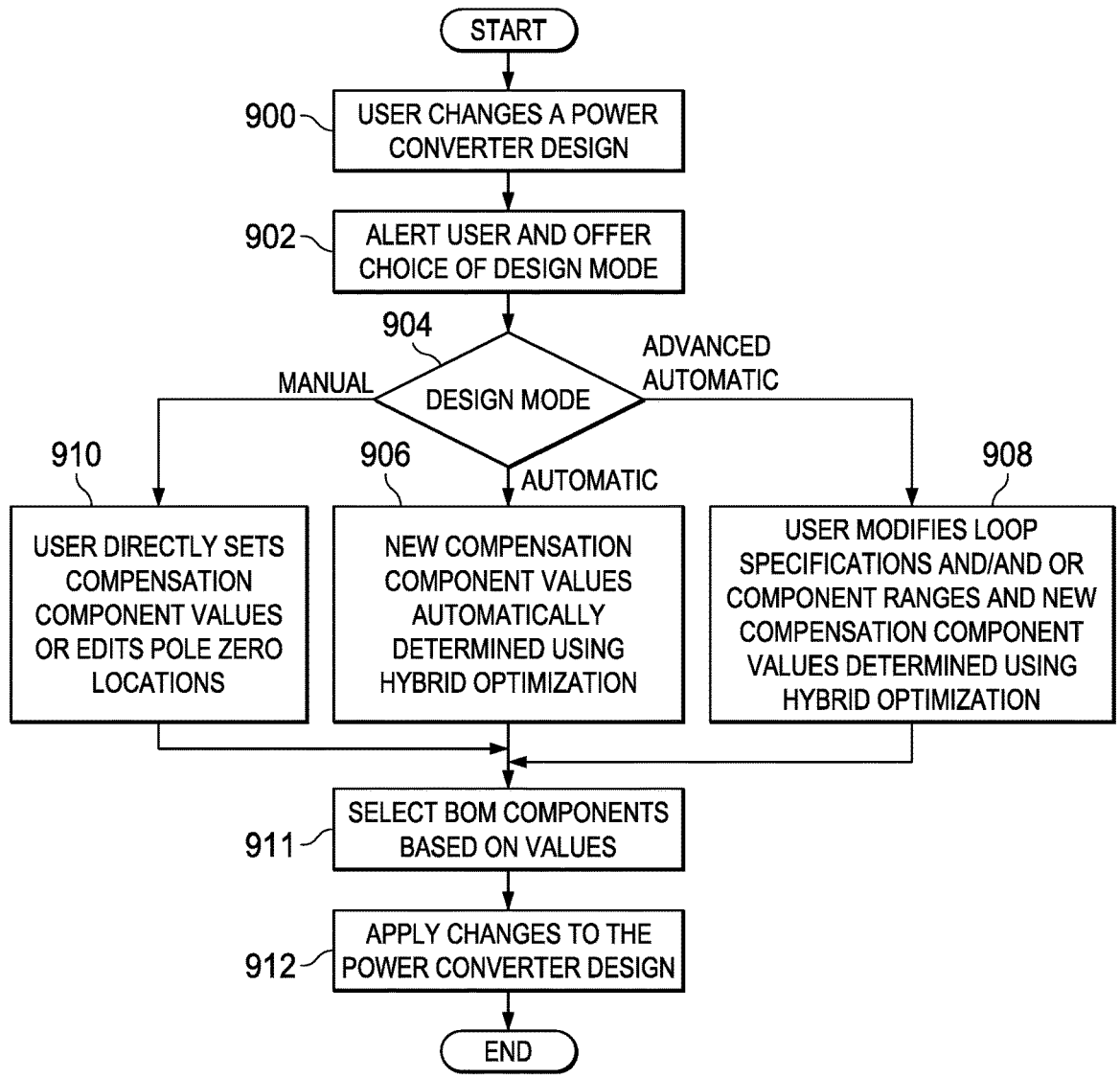
FIG. 9 is a flow diagram of an example compensation network design flow in a power converter design system.

FIG. 9 is a flow diagram of an example compensation network design flow in a power converter design system. The diagram assumes an existing power converter design designed using the power converter design system. When a user makes a change 900 to an existing power converter design, the user may be alerted 902 that the compensation network needs to be redesigned due to the change and offered a choice 904 of three design modes: automatic mode, advanced automatic mode, or manual mode. The alert may occur automatically when any change is made or may occur if the change makes the design unstable, e.g., one or more of the loop specifications are no longer in range.

If automatic mode is selected, new compensation component values are automatically determined 906 using hybrid optimization with no input from the user. That is, an embodiment of the method of FIG. 6 may be executed to compute the new compensation component values. BOM components for the capacitors and resistors in the compensation network are then selected 911 based on the corresponding compensation component values and changes based on the selected BOM components may then be applied 912 to the power converter design.

The BOM components may be selected, for example, by searching a database of BOM components using search criteria based on the computed compensation component values and other parameters typical of the type of a component. For example, parameters for a capacitor may be capacitance, equivalent series resistance (ESR), voltage rating, type, power rating, tolerance, price, foot print, etc. and parameters for a resistor may be resistance, type, power rating, tolerance, price, foot print, etc. To search the database for suitable BOM components, minimum, maximum, and/or target values may be specified for the parameters. For example, to search for BOM capacitors, minimum, maximum, and target values for capacitance and ESR may be specified, a maximum value for voltage rating may be specified, etc.

The search of the database for a given capacitor or resistor may result in no match found. In some embodiments, a custom component is created. The search of the database for a given capacitor or resistor may also result in multiple BOM components that meet the search criteria. In such cases, to choose one of the BOM components, the BOM components may be sorted in decreasing order based on a merit factor and the BOM component with the highest merit factor chosen. The merit factor may be derived based on the following: 1) the sum of the square of the error between target and actual values of the parameters; 2) cost; 3) foot print size; and 4) parasitic losses in the component.

In some embodiments, an optimization factor may also be specified prior to the database search and used as in deriving the merit factors. The optimization factor allows a user to indicate the importance of component selection criteria such as foot print, cost, and efficiency. For example, the optimization factor may be an integer between 1 and 5 where a value of 1 indicates choose the component with the smallest footprint, a value of 2 indicates choose the lowest cost component, a value of 3 indicates choose a balanced component, a value of 4 indicates choose a component for higher efficiency, and a value of 5 indicates choose a component for best efficiency. The user selected optimization factor may be used as a tie breaker when two components have the same sum of the square error. For example, if the optimization factor is 1, the component with the smaller footprint is given higher merit. If the optimization factor is 2, the component with the lower cost is given higher merit.

Referring again to FIG. 9, if advanced automatic mode is selected, the user is given the opportunity to modify 908 loop specifications and/or compensation component ranges. That is, an embodiment of the method of FIG. 6 may be executed in which after the loop specifications are determined 604, user specified changes are received before the objective function is computed 604. The user may be presented with a graphical user interface (GUI) such as that of FIG. 9 to input the desired changes. Once the user has made the desired changes, execution of the method of FIG. 6 is completed to determine new compensation values using hybrid optimization. BOM components for the capacitors and resistors in the compensation network are then selected 911 based on the corresponding compensation component values and changes based on the selected BOM components may then be applied 912 to the power converter design.

If the manual mode is selected, the user is given the opportunity to directly set 910 the compensation component values or to edit pole zero locations and have compensation component values computed based on the pole zero locations. The user may be presented with a GUI such as that of FIGS. 11A-11C to input the desired changes. As is explained in more detail in reference to FIGS. 11A-11C, the editing of the pole zero locations may be performed with direct numerical inputs or by visual pole-zero placement in which the user can drag and drop poles and zeros to the desired frequency on a Bode plot. BOM components for the capacitors and resistors in the compensation network are then selected 911 based on the corresponding compensation component values and changes based on the selected BOM components may then be applied 912 to the power converter design.

Compensation component values may be computed from pole zero locations based on the transfer function of the compensation network. The computation of compensation components from pole zero locations is explained in reference to a simple example for a Type-II compensation network. Given this explanation, one of ordinary skill in the art will understand such computation for other compensation networks. The transfer function of a system is a rational function in s, the complex Laplace transform frequency variable. Further, zeroes are the roots of the numerator polynomial in s and poles are the roots of the denominator polynomial in s. Thus, the compensation network transfer function of a Type-II compensation network is given by $$Gc(s) = g * \left(1 + \frac{s}{z1}\right) \Big/ \left(s\left(1 + \frac{s}{p1}\right)\right)$$

where g is the gain term, −z1 is the zero and −p1 is the non-zero pole. Further, as shown in FIG. 3, the transfer function for a voltage amplifier using Type-II compensation may given by $$\frac{1 + sR_a C_a}{sR_{f1}(C_a + C_b)\left(1 + \frac{sR_a C_a C_b}{C_a + C_b}\right)}.$$

Equating the terms gives the following equations for g, z1, and p1 that can be solved for the three unknowns $R_a$, $C_a$, and $C_b$ (assuming $R_{f1}$ is known):

$$g=1/(R_{f1}*(C_a+C_b)),$$

$$z1=1/(R_a*C_a)$$

$$p1=(C_a+C_b)/(R_a*C_b).$$

The equations for z1, and p1 also indicate that some pole and zero values are not implementable. That is, $$p1=(C_a+C_b)/(R_a*C_a*C_b)=1/R_a*C_e \text{ where } C_e=(C_a*C_b)/(C_a+C_b).$$

From the above equation for $C_e$, $C_e<C_a$, as $(C_b)/(C_a+C_b)$ <1 which implies p1>z1 is required. Thus, a user may not be allowed to specify values for p1 and z1 such that p1<z1, e.g., an error is signaled in such a case.

Even with seemingly good values for the poles and zeroes, the computation of the compensation component values from the poles and zeros may show that the pole zero locations are not implementable due to, for example, parasitics. In such cases, an error may be signaled and the user given another opportunity to specify the pole zero locations.

Figure 10B:
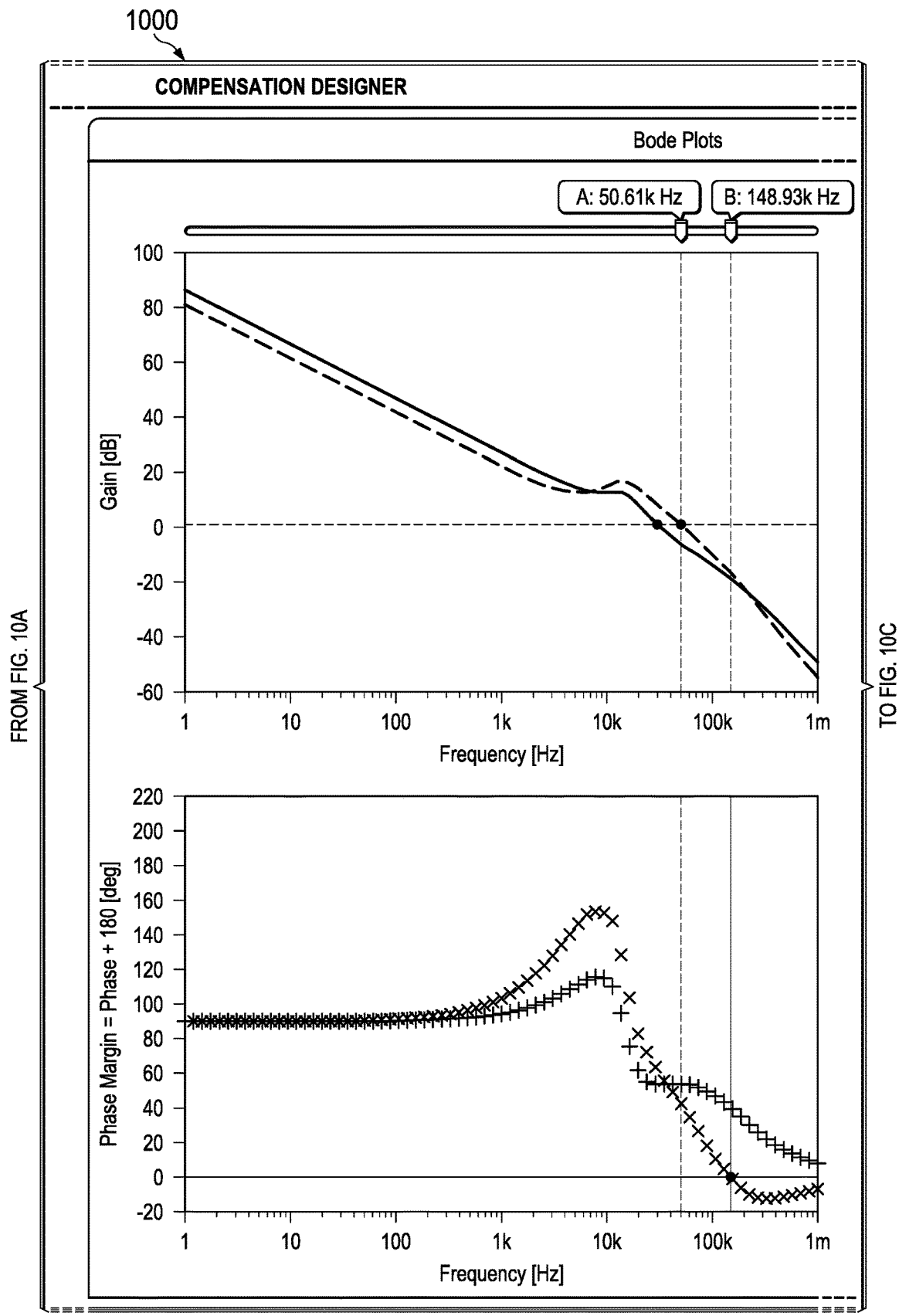
Figure 10C:
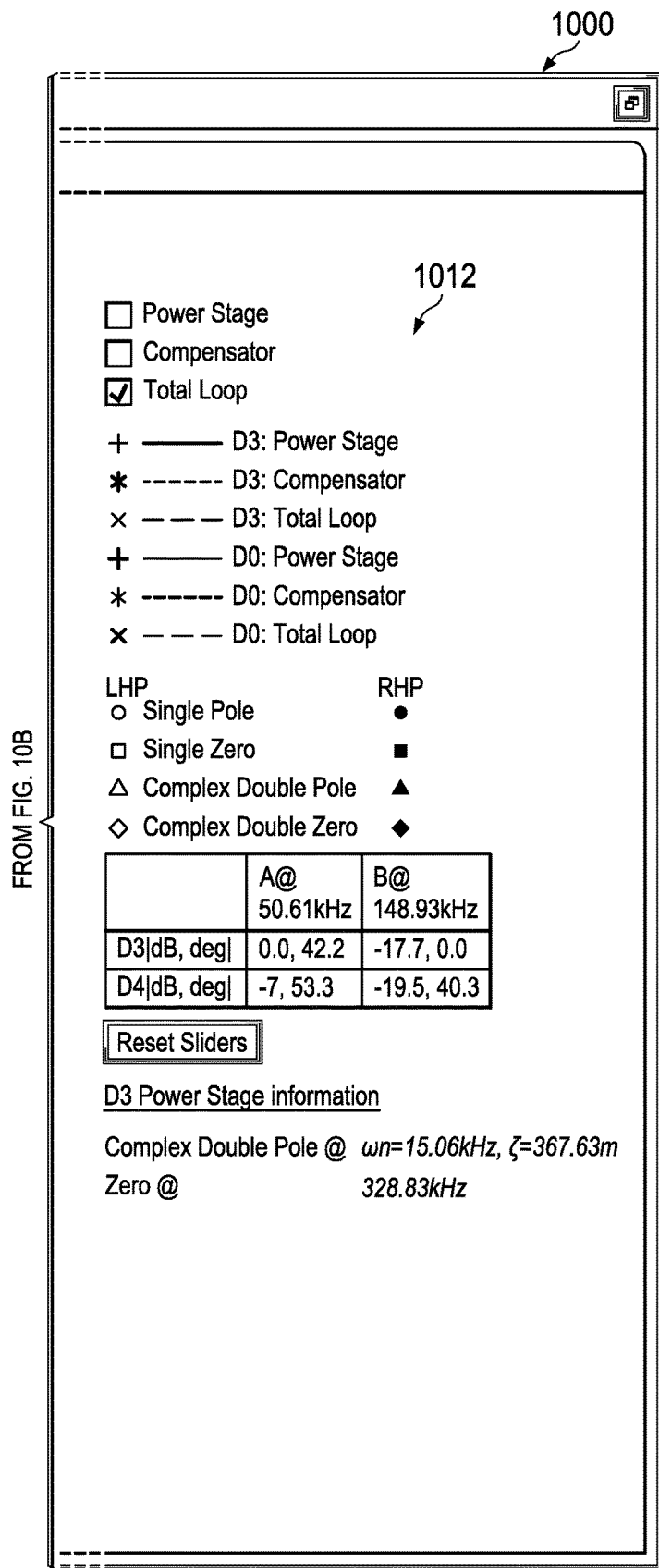

FIGS. 10A-10C illustrate an example graphical user interface (GUI) 1000 that may be presented to a user if advanced automatic mode is selected in the design flow of FIG. 9. In the example GUI 1000, the current values for the loop specifications are displayed in the Design Operating Values area 1002, and the compensation components of the compensation network along with their current minimum and maximum values are displayed in the Compensation Components area 1006. Initially, the values displayed in these two areas may be values resulting from the identification 602 of the compensation components and the determination 604 of the loop specifications in the method of FIG. 6. The GUI 1000 also includes a slider interface 1004 to allow the user to perform optimization tuning as a tradeoff between performance and robustness. The position of the slider is used to change the weights in the objective function accordingly.

As is well known, a Bode plot is a plot of gain and phase of a transfer function. That is, a Bode plot includes two plots, one of gain versus frequency and one of phase versus frequency. In the Bode Plot area 1012, the top plot is the gain versus frequency plot and the bottom plot is the phase versus frequency plot with the phase shifted by 180 degrees for ease of determining the phase margin. The user has the option of displaying any combination of the power stage transfer function, the compensation transfer function, and the total loop transfer function. In this example, the Bode plot shows the total loop transfer function.

The user may change any of the values in the Design Operating Values area 1002 and/or the Compensation Components area 1006 and/or adjust the position of the slider 1004 and then select the Auto Compensate option 1008 to initiate computation of compensation component values and the selection of BOM components based on those values. The compensation component values of the BOM components and the loop specifications resulting from these compensation values are displayed in the GUI 1000. In particular, in the GUI 1000, the compensation values of the selected BOM components are shown to the right of the maximum value for each compensation network component in the Compensation Components area 1006 and the computed loop specifications are shown to the right of the maximum value of the respective loop specification in the Design Operating Values area 1002. The Bode plot in the Bode plot area 1012 is also updated.

Although not specifically shown in FIG. 9, the user may make further changes, i.e., the design flow may iterate between modification of values and selection of BOM components until the user is satisfied with the compensation network design. Once the user is satisfied, the user may select the Apply changes to design option 1010 to add the selected BOM compensation components to the power converter design.

Figure 11B:
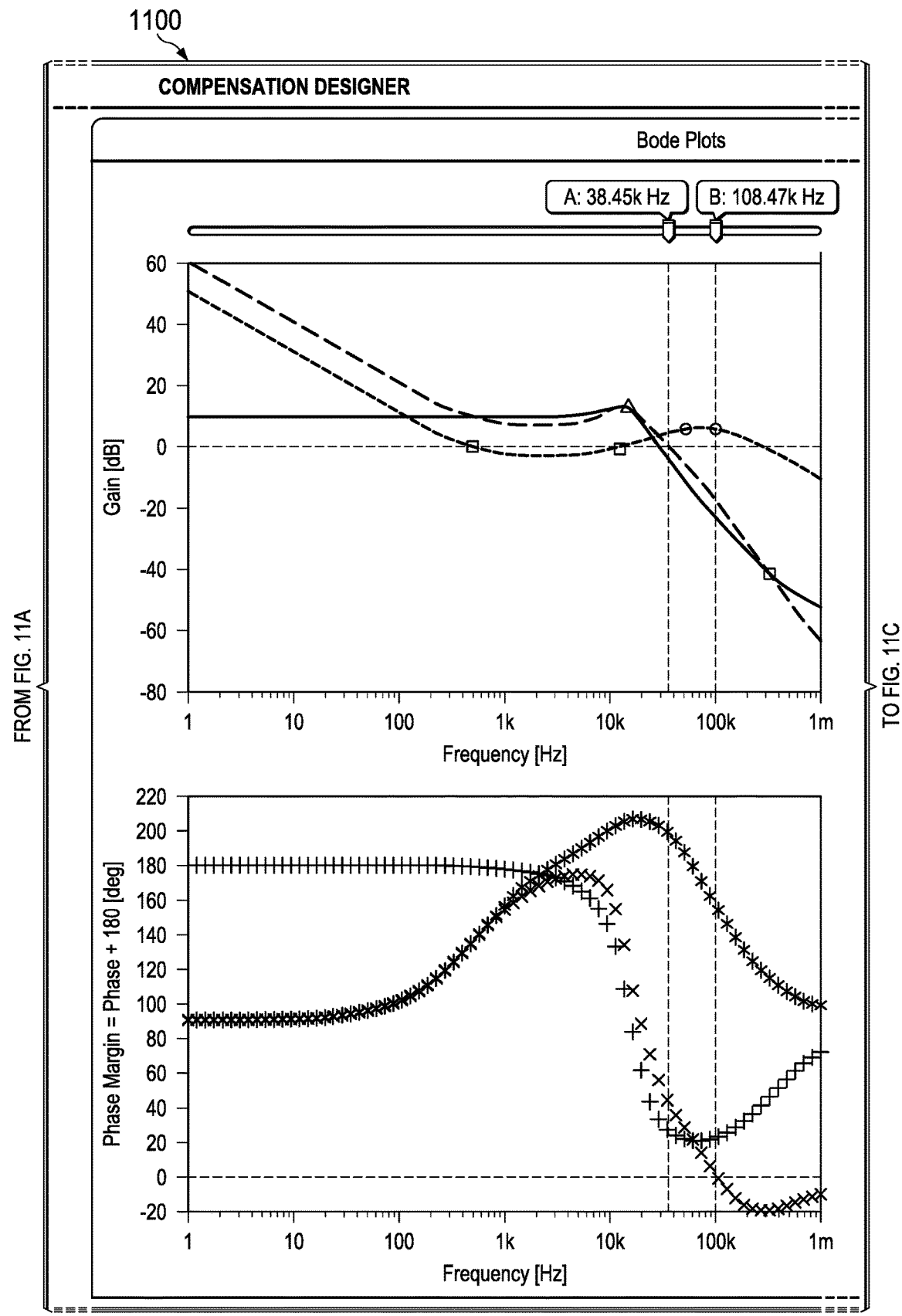
Figure 11C:
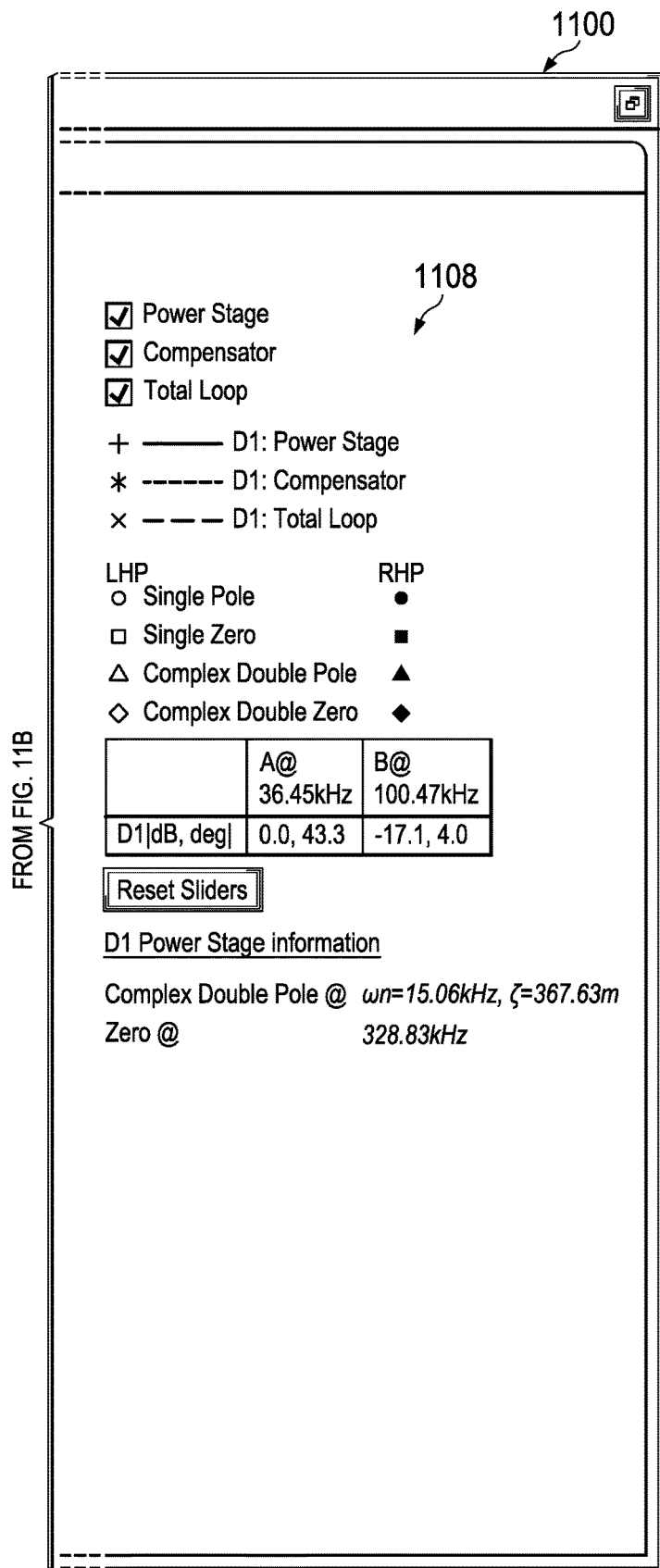

FIGS. 11A-11C illustrate an example graphical user interface (GUI) 1100 that may be presented to a user if manual mode is selected in the design flow of FIG. 9. In the example GUI 1100, the current values for the loop specifications are displayed in the Design Operating Values area 1102. Three manual input options are provided in an Edit Components area 1104, an Edit Poles/Zeros area 1106, and a Bode Plot placement area 1108. The compensation network components and their current values are displayed in the Edit Components area 1104. The poles and zeros of the current design are graphically displayed on the top plot in the Bode Plot placement area 1108 and their numerical values are displayed in the Edit Poles/Zeros area 1106 along with gain. In the Bode Plot placement area 1108, the top plot is the gain versus frequency plot and the bottom plot is the phase versus frequency plot with the phase shifted by 180 degrees for ease of determining the phase margin. The user has the option of displaying any combination of the power stage transfer function, the compensation transfer function, and the total loop transfer function. In this example, the Bode plot shows all three transfer functions.

The user can directly edit the values of the compensation network components in the Edit Component area 1104 and select the Calculate option 1110 to initiate the selection of BOM components based on the currently specified values. Alternatively, the user can directly edit the poles and zeros in the Edit Poles/Zeros area 1106 and select the Calculate option 1110 to initiate computation of compensation component values based on the specified poles and zeros and the selection of BOM components based on the computed values. As previously mentioned, an error may be signaled if the specified poles and zeroes are not implementable.

In either case, the compensation component values of the selected BOM components and the loop specifications resulting from these compensation component values are displayed in the GUI 1100. In particular, in the GUI 1100, the compensation values of the selected BOM components are displayed to the right of specified value for each compensation network component in the Compensation Components area 1006 and the poles and zeros resulting from the selected BOM components are displayed to the right of the specified poles and zeros in the Edit Poles/Zeros area 1106. The computed loop specifications are displayed inn in the Design Operating Values area 1102. The Bode plot in the Bode plot placement area 1108 is also updated.

The user can also specify poles and zeros by dragging and dropping poles and zeros on the top plot in the Bode Plot placement area 1108. As the poles and zeros are moved, the compensation component values in the Edit Component area 1104 and the loop specification values in the Design Operating Values area 1102 are changed accordingly. That is, calculation of compensation component values from the poles and zeros and computation of loop specifications is performed as the poles and zeros are moved. As previously mentioned, an error may be signaled if the specified poles and zeroes are not implementable.

Although not specifically shown in FIG. 9, the user may make further changes, i.e., the design flow may iterate between modification of values and selection of BOM components until the user is satisfied with the compensation network design. Further, the user may use any of the three options for manual design in each iteration. Once the user is satisfied, the user may select the Apply changes to design option 1112 to add the selected BOM compensation components to the power converter design.

Figure 12:
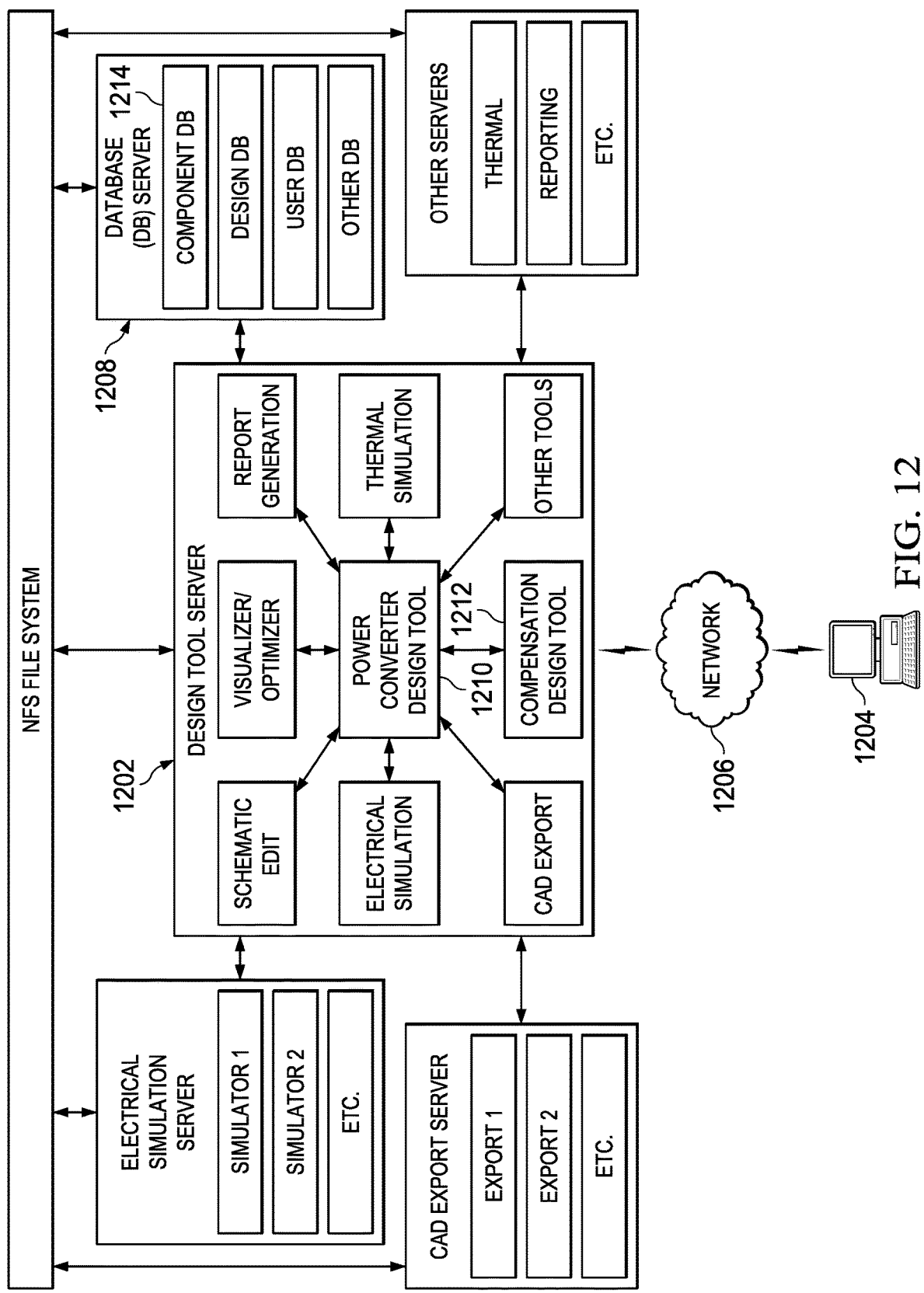
FIG. 12 is a block diagram of an example power converter design system.

FIG. 12 is a block diagram of an example power converter design system configured to perform embodiments of the methods for compensation network design described herein. The depicted system includes a design tool server 1202 coupled to a desktop computer 1204 via a network 1206. The network 1206 may be any suitable communication medium, or combination of communication media, such as, for example, wired or wireless communication media, a local area network, or a wide area network.

The design tool server 1202 is an application server hosting several web applications including a power converter design tool 1210 and a compensation design tool 1212. That is, the tools 1210, 1212 are client-server applications in which the client (or user interface) executes in a web browser. The design tool server 1202 is coupled to a database server 1208 hosting a component database 1214. The component database 1214 stores data regarding bill of material (BOM) components that may be used in a power converter design, i.e., it is a database of real world inductors, capacitors, resistors, MOSFETs, and active components. The power converter design tool 1210 provides functionality for a user of a web browser executing on the computer 1204 to design a power converter that meets the desired performance parameters. The power converter design tool 1210 also provides functionality to select bill of materials (BOM) of components that meet the performance requirements from the component database 1214. The power converter design generated by the power converter design tool 1210 includes a compensation network.

The compensation design tool 1212 includes functionality to allow a user of a web browser executing the computer 1204 to redesign a compensation network of a power converter design generated by the power converter design tool 1210. More specifically, the compensation design tool 1212 implements one or more of the methods described herein.

Figure 13:
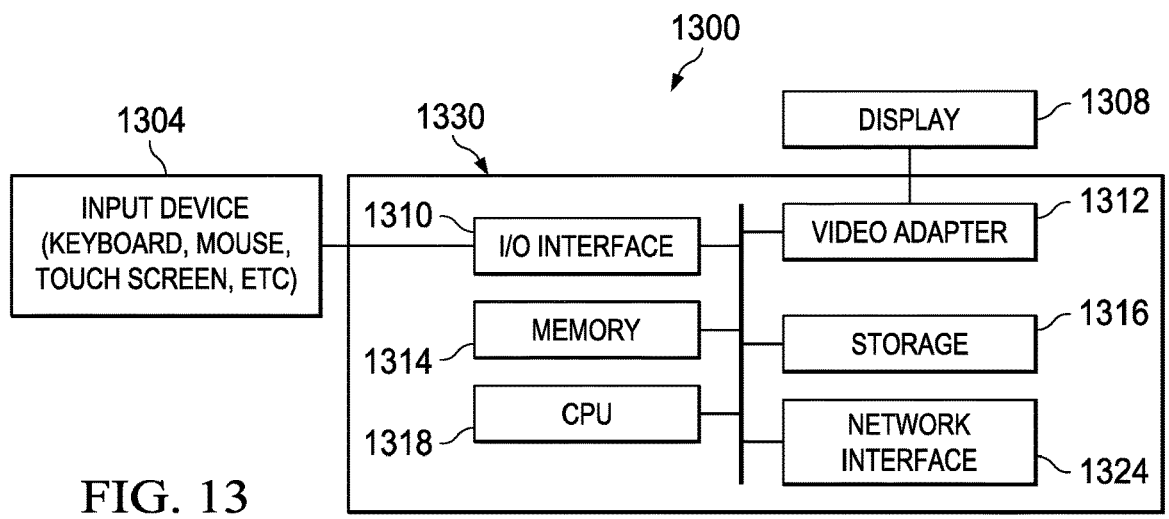
FIG. 13 is a block diagram of a computer system.

FIG. 13 is a simplified block diagram of a computer system 1300 that may be used as the design tool server 1200 and the computer system 1204 of the power converter design system of FIG. 12. The computer system 1300 includes a processing unit 1330 equipped with one or more input devices 1304 (e.g., a mouse, a keyboard, or the like), and one or more output devices, such as a display 1308, or the like. In some embodiments, the display 1308 may be touch screen, thus allowing the display 1308 to also function as an input device. The display may be any suitable visual display unit such as, for example, a computer monitor, an LED, LCD, or plasma display, a television, a high definition television, or a combination thereof.

The processing unit 1330 includes a central processing unit (CPU) 1318, memory 1314, a storage device 1316, a video adapter 1312, an I/O interface 1310, a video decoder 1322, and a network interface 1324 connected to a bus. The bus may be one or more of any type of several bus architectures including a memory bus or memory controller, a peripheral bus, video bus, or the like.

The CPU 1318 may be any suitable type and suitable combination of electronic data processors. For example, the CPU 1318 may include one or more processors from Intel Corp. or Advanced Micro Devices, Inc., one or more Reduced Instruction Set Computers (RISC), one or more Application-Specific Integrated Circuits (ASIC), one or more digital signal processors (DSP), or the like. The memory 1314 may be any type of system memory such as static random access memory (SRAM), dynamic random access memory (DRAM), synchronous DRAM (SDRAM), read-only memory (ROM), flash memory, a combination thereof, or the like. Further, the memory 1314 may include ROM for use at boot-up, and DRAM for data storage for use while executing programs.

The storage device 1316 (e.g., a computer readable medium) may include any type of storage device configured to store data, programs, and other information and to make the data, programs, and other information accessible via the bus. The storage device 1316 may be, for example, one or more of a hard disk drive, a magnetic disk drive, an optical disk drive, or the like. For the design tool server 1202, the storage device 1316 stores software instructions of the power converter design tool 1210 and the compensation design tool 1212. The software instructions may be initially stored in a computer-readable medium such as a compact disc (CD), a diskette, a tape, a file, memory, or any other computer readable storage device and loaded and executed by the CPU 1318. In some cases, the software instructions may also be sold in a computer program product, which includes the computer-readable medium and packaging materials for the computer-readable medium. In some cases, the software instructions may be distributed to the computer system 1300 via removable computer readable media (e.g., floppy disk, optical disk, flash memory, USB key), via a transmission path from computer readable media on another computer system (e.g., a server), etc.

The video adapter 1312 and the I/O interface 1310 provide interfaces to couple external input and output devices to the processing unit 1330. As illustrated in FIG. 13, examples of input and output devices include the display 1308 coupled to the video adapter 1312 and the mouse/keyboard 1304 coupled to the I/O interface 1310.

The network interface 1324 allows the processing unit 1330 to communicate with remote units via a network. For example, in the design tool server 1202, the network interface 1324 allows the computer system 1300 to communicate via the network 1206 to the desktop computer 1204. Similarly, in the desktop computer 1204, the network interface 1324 allows the computer system 1300 to communicate via the network 1206 to the design toll server 1202. The network interface 1324 may provide an interface for a wired link, such as an Ethernet cable or the like, and/or a wireless link via, for example, a local area network (LAN), a wide area network (WAN) such as the Internet, a cellular network, any other similar type of network and/or any combination thereof.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described herein in which equations are given for determining the conjugate gradient descent direction and step size. One of ordinary skill in the art will understand embodiments in which other suitable equations are used.

In another example, embodiments have been described herein in which the step length for the CG algorithm is computed in each iteration. One of ordinary skill in the art will understand embodiments in which the same step length is used for some number of iterations before being recomputed. Further, one of ordinary skill in the art will understand embodiments in which the step length is a constant.

In another example, embodiments have been described herein in which the power converter design system software is implemented as web applications which a user accesses via a web browser on a computer system. One of ordinary skill in the art will understand embodiments in which the software may be implemented differently, such as for example, as applications executing on the user's computer system or as client server applications in which a user interface and some functionality executes as an application(s) on the user's computer system and the remaining functionality is hosted on a server.

In another example, embodiments have been described herein in which the computer system in the power converter design system is a desktop computer. One of ordinary skill in the art will understand embodiments in which the computer system is any suitable computing device, such as, for example, a laptop computer or a tablet.

In another example, embodiments have been described herein in which a set of rules used by the differential evolution algorithm to generate vector populations is defined. One of ordinary skill in the art will understand embodiments in which other sets of rules are used.

In another example, embodiments have been described herein in which a few compensation types were mentioned. One of ordinary skill in the art will understand that other compensation types may be used, such as, for example, lead compensation or lag compensation.

In another example, embodiments have been described herein in which a hybrid optimization algorithm is used to minimize the objective function. One of ordinary skill in the art will understand embodiments in which other suitable optimization algorithms are used, such as, for example, DE alone, CG alone, particle swarm optimization, steepest descent, and a genetic algorithm.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Software instructions implementing methods described herein may be initially stored in a computer-readable medium and loaded and executed by a processor. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Certain terms are used throughout the description and the claims to refer to particular system components. As one skilled in the art will appreciate, components in systems may be referred to by different names and/or may be combined in ways not shown herein without departing from the described functionality. This document does not intend to distinguish between components that differ in name but not function. In the description and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A method comprising:
   receiving, by a power converter design system, a minimum resistor value, a maximum resistor value, a minimum capacitance value, a maximum capacitance value, a target phase margin, a target low frequency gain, a target gain margin, and a target gain cross-over frequency;
   determining, by the power converter design system, a weighted resistor-capacitor (RC) time constants based on the minimum resistor value, the maximum resistor value, the minimum capacitance value, and the maximum capacitance value
   computing, by a power converter design system, values for compensation components in a compensation network by minimizing an objective function given by $O(c)=Se(c)+T_{RC}(c)+S_{PM}(c)+P(c)$ where:

c is a vector of values of the minimum resistor value, the maximum resistor value, the minimum capacitance value, a maximum capacitance value, and the gain cross-over frequency;
   Se(c) is a sum of weighted square error of the target phase margin, the target low frequency gain, the target gain margin, and the target gain cross-over frequency;
   $T_{RC}(c)$ is a sum of the weighted resistor-capacitor (RC) time constants;
   $S_{PM}(c)$ is a weighted slope of a phase curve at the gain cross-over frequency; and
   P(c) is a penalty function;
   selecting, by the power converter design system, passive components for the compensation components in the compensation network based on the computed values; and
   communicating, by the power converter design system to a display, passive components for the compensation components in the compensation network, the display is adapted to be coupled to the power converter design system.

2. The method of claim 1, wherein the objective function comprises in part a loop-gain model of the power converter design to compute loop specification values for candidate values of the components, the derivation of the loop-gain model including power stage parasitics and non-ideal behavior of a feedback amplifier in the power converter design.

3. The method of claim 2, wherein the loop-gain model is a unified model.

4. The method of claim 1, wherein minimizing an objective function comprises using a hybrid optimization algorithm to minimize the objective function, the hybrid optimization algorithm combining a differential evolution algorithm and a conjugate gradient algorithm.

5. The method of claim 1, further comprising:
   identifying the compensation components from the power converter design; and
   determining the minimum, maximum, and target values of the loop specification.

6. The method of claim 5, further comprising receiving user specified changes to at least one of the minimum, maximum, and target values.

7. The method of claim 1, further comprising receiving user specified optimization tuning indicating relative importance of performance and robustness, wherein one or more weights in the objective function are changed based on the user specified optimization tuning.

8. A system comprising:
   a display;
   a component database in a server, the component database configured to store data regarding passive components;
   a power converter design tool in the server, the power converter design tool is communicatively coupled to the component database and the display, the power converter design tool is configured to:
     receive a minimum resistor value, a maximum resistor value, a minimum capacitance value, a maximum capacitance value, a target phase margin, a target low frequency gain, a target gain margin, and a target gain cross-over frequency;
     determine a weighted resistor-capacitor (RC) time constants based on the minimum resistor value, the maximum resistor value, the minimum capacitance value, and the maximum capacitance value;
     computing, by a power converter design system, values for compensation components in a compensation network by minimizing an objective function given by $O(c)=Se(c)+T_{RC}(c)+S_{PM}(c)+P(c)$ where:

c is a vector of values of the minimum resistor value, the maximum resistor value, the minimum capacitance value, a maximum capacitance value, and the gain cross-over frequency;

Se(c) is a sum of weighted square error of the target phase margin, the target low frequency gain, the target gain margin, and the target gain cross-over frequency;

$T_{RC}(c)$ is a sum of the weighted resistor-capacitor (RC) time constants;

$S_{PM}(c)$ is a weighted slope of a phase curve at the gain cross-over frequency; and P(c) is a penalty function;

select passive components for the compensation components in the compensation network based on the computed values and the stored data in the component database; and communicate, to the display, the passive components for the compensation components in the compensation network.

9. The system of claim 8, wherein the minimization is performed by execution of a hybrid optimization algorithm combining a differential evolution algorithm and a conjugate gradient algorithm.

10. The system of claim 8, wherein the values are further computed based on power stage parasitics and non-ideal behavior of a feedback amplifier in the power converter design.

11. The system of claim 8, wherein the values are further computed based on poles and zeros placed on a Bode plot by a user of the compensation design tool, the Bode plot displayed in a graphical user interface of the compensation design tool.

12. The system of claim 8, wherein selection of passive components is further based on a user specified optimization factor.

13. The system of claim 12, wherein the user specified optimization factor indicates relative importance of a footprint of a passive component, cost of a passive component, and efficiency of a passive component.

14. The system of claim 8, wherein the objective function comprises in part a loop-gain model of the power converter design to compute loop specification values for candidate values of the components, the derivation of the loop-gain model including power stage parasitics and non-ideal behavior of a feedback amplifier in the power converter design.

15. The system of claim 14, wherein the loop-gain model is a unified model.

\* \* \* \* \*